(12) United States Patent
Hsu

(10) Patent No.: US 12,472,877 B2
(45) Date of Patent: *Nov. 18, 2025

(54) VEHICLE SEAT STORAGE SYSTEM

(71) Applicant: Wei K. Hsu, Parker, TX (US)

(72) Inventor: Wei K. Hsu, Parker, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/070,866

(22) Filed: Mar. 5, 2025

(65) Prior Publication Data

US 2025/0276651 A1 Sep. 4, 2025

Related U.S. Application Data

(63) Continuation of application No. 18/761,470, filed on Jul. 2, 2024, now Pat. No. 12,263,813, which is a continuation-in-part of application No. 18/593,313, filed on Mar. 1, 2024, now Pat. No. 12,024,129.

(51) Int. Cl.
*B60R 7/04* (2006.01)
*B60R 11/00* (2006.01)

(52) U.S. Cl.
CPC ........ *B60R 7/043* (2013.01); *B60R 2011/0015* (2013.01); *B60R 2011/0059* (2013.01); *B60R 2011/0075* (2013.01); *B60R 2011/0082* (2013.01)

(58) Field of Classification Search
CPC ...................................................... B60R 7/043
USPC ....................................................... 224/275
See application file for complete search history.

(56) References Cited

U.S. PATENT DOCUMENTS

| | | | |
|---|---|---|---|
| 2,853,219 | A | 9/1958 | Harry |
| 3,115,959 | A | 12/1963 | Jaffe |
| 4,266,704 | A | 5/1981 | Swanson |
| 4,655,343 | A | 4/1987 | Lane et al. |
| 4,790,592 | A | 12/1988 | Busso et al. |
| D324,953 | S | 3/1992 | Swanner |
| 5,354,119 | A | 10/1994 | Nicholas |
| D412,311 | S | 7/1999 | Silvershein |
| 6,030,034 | A | 2/2000 | Plohetski |
| 6,244,484 | B1 | 6/2001 | Farrell |

(Continued)

FOREIGN PATENT DOCUMENTS

| | | |
|---|---|---|
| AU | 2020102659 A4 | 1/2021 |
| CN | 207059914 U | 3/2018 |

(Continued)

OTHER PUBLICATIONS

Extended European Search Report dated Sep. 11, 2024 in counterpart European Patent Application No. EP24165692.5, pp. 1-9.

(Continued)

*Primary Examiner* — Justin M Larson
(74) *Attorney, Agent, or Firm* — Grady K. Bergen; Griggs Bergen LLP

(57) ABSTRACT

A vehicle seat-top storage device has a lower layer formed from a flexible material configured to overlay and conform to portions of a vehicle seat. An upper layer of a flexible sheet material is coupled along side edges to the lower layer to define an interior space between the lower and upper layers. An opening of the device allows access to the interior space through the opening. A closure device is provided for selectively opening and closing the opening.

20 Claims, 19 Drawing Sheets

(56) References Cited

U.S. PATENT DOCUMENTS

| | | |
|---|---|---|
| 6,338,527 B1 | 1/2002 | Toyota et al. |
| D479,186 S | 9/2003 | Hassett |
| 6,676,209 B1 | 1/2004 | Szabo et al. |
| 6,763,986 B2 | 7/2004 | Santos et al. |
| D498,585 S | 11/2004 | Darling |
| 7,309,102 B1 | 12/2007 | Davis |
| 7,517,013 B1 | 4/2009 | Lowe |
| D632,242 S | 2/2011 | Currie |
| 7,891,733 B1 | 2/2011 | Clarke |
| 8,201,684 B2 * | 6/2012 | Torrellas .......... A45C 3/004 206/287.1 |
| 8,360,519 B1 | 1/2013 | Hsu |
| 8,408,642 B1 | 4/2013 | Reidy |
| 8,418,901 B2 | 4/2013 | Stimmell |
| 8,454,085 B1 | 6/2013 | Hsu |
| 8,556,337 B1 | 10/2013 | Cornitius-Cary |
| 9,693,612 B2 | 7/2017 | Newman |
| D833,140 S | 11/2018 | Oliver |
| 10,486,606 B1 | 11/2019 | Stabile |
| 10,632,880 B2 | 4/2020 | Lehtonen |
| 11,001,203 B2 | 5/2021 | Bryant et al. |
| 12,024,129 B1 | 7/2024 | Hsu |
| 2003/0230612 A1 | 12/2003 | Santos et al. |
| 2004/0183347 A1 | 9/2004 | Szabo et al. |
| 2005/0023312 A1 | 2/2005 | Steinberg |

FOREIGN PATENT DOCUMENTS

| | | |
|---|---|---|
| CN | 219396486 U | 7/2023 |
| DE | 1256938 B | 12/1967 |
| DE | 102009021109 A1 | 11/2010 |
| GB | 2470080 A | 11/2010 |
| GB | 2476291 A | 6/2011 |
| KR | 20120004983 U | 7/2012 |
| WO | WO2023081027 A1 | 5/2023 |

OTHER PUBLICATIONS

International Search Report and Written Opinion dated Jun. 30, 2025 in related International PCT Patent Application No. PCT/US2025/017572, pp. 1-16.

"Collapsible Dog Cat Car Seat, Metal Frame Puppy Carrier for Small Medium Dog Pet up to 15 lbs" (Amazon) Jul. 23, 2020 (Jul. 23, 2023); retrieved from Internet Apr. 10, 2024; URL=[https://www.amazon.com/BEELIKE-Collapsible-Reinforce-Construction-Vehichels/dp/B08DHMYFSP?th=1]; especially About this item para 1-2 p. 1, and Inset Figure p. 1. About this item para 1-2 p. 1: Inset Figure p. 1.

* cited by examiner

VEHICLE SEAT STORAGE SYSTEM

CROSS-REFERENCE TO RELATED APPLICATIONS

This application is a continuation of U.S. application Ser. No. 18/761,470, filed Jul. 2, 2024, which is a continuation-in-part of U.S. patent application Ser. No. 18/593,313, filed Mar. 1, 2024, now U.S. Pat. No. 12,024,129, each of which is incorporated herein by reference for all purposes.

TECHNICAL FIELD

The present disclosure relates to storage devices and seat covers for vehicles.

BACKGROUND

While vehicle seats serve their primary function of providing seating for vehicle occupants, there is a need for an improved storage system that optimizes the utilization of the available space of unoccupied vehicle seats to be used to store and retain items on the seat so that they are readily accessible and that may provide protection to the seat itself.

Current solutions for in-vehicle storage vary in design and functionality, including traditional glove compartments, center consoles, seatback pockets, etc. These existing storage options may be less convenient or unsuitable for storing certain items. While vehicle occupants may at times place bags or other articles on the seat itself, this can damage or soil the seat. Additionally, abrupt or sudden stops of the vehicle may cause the items to slide off the seat top to a position where they are not easily retrieved or that may result in damage to the item.

The present disclosure describes ways to overcome these limitations and contributes to the efficient use of space within vehicles by providing a seat-top storage device that is specifically designed for a vehicle seat. The device offers a secure and organized means of storing various items, such as electronic devices, mobile phones, tablets, laptop computers, bags or purses, shopping bags, clothing items, documents, food items and snacks, or other personal items that are easily stored, readily accessible and prevented from sliding off the seat. Additionally, the device is designed for easy positioning and securing to the vehicle seat, as well as easy detachment, collapsing and storing the device out of sight, so that a passenger may still use the seat in a conventional manner.

BRIEF DESCRIPTION OF THE DRAWINGS

For a more complete understanding of the embodiments described herein, and the advantages thereof, reference is now made to the following descriptions taken in conjunction with the accompanying figures, in which.

DETAILED DESCRIPTION

Figure 1:
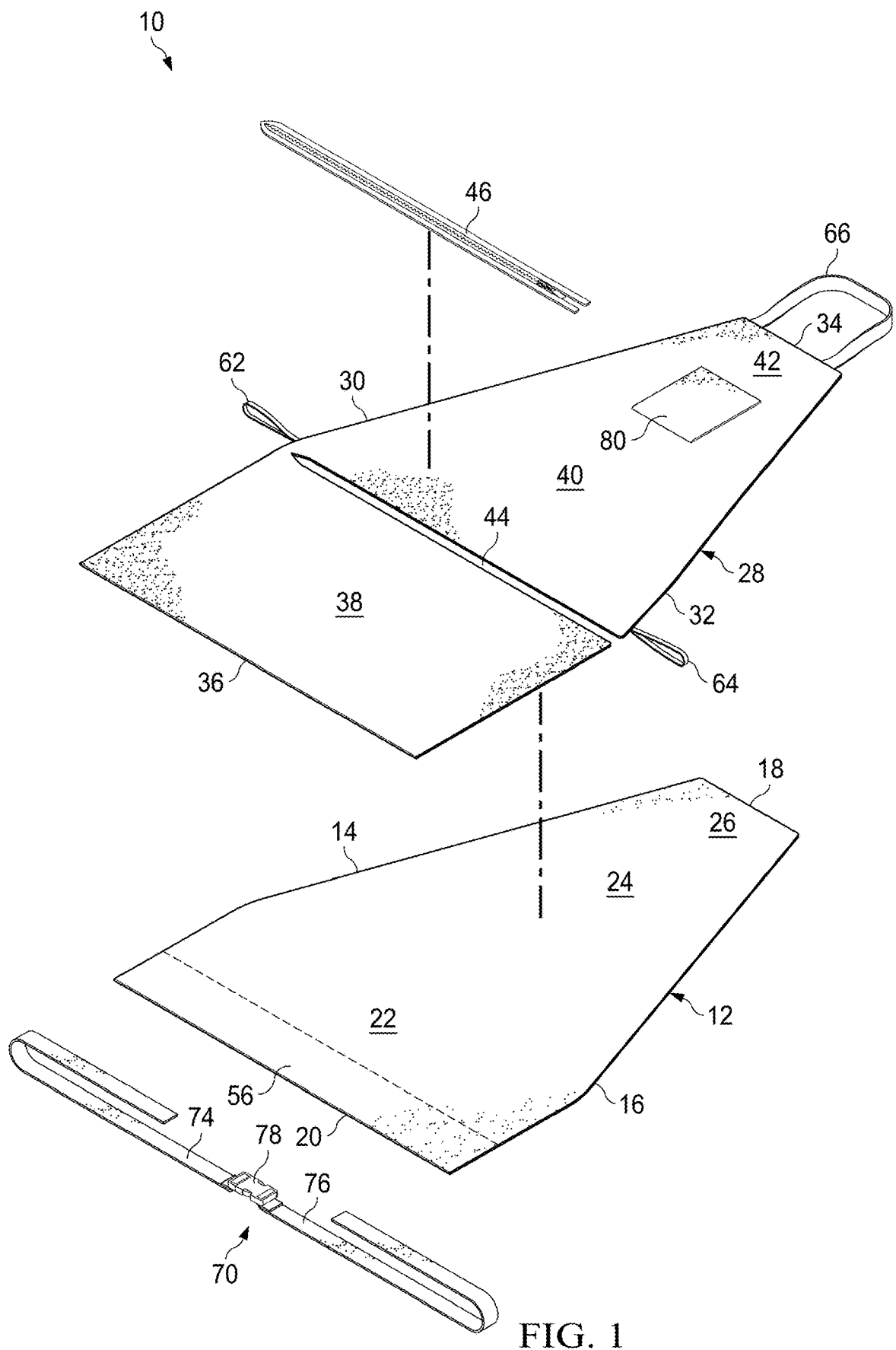
FIG. 1 is an exploded, perspective view of a seat-top storage device constructed in accordance with particular embodiments of the disclosure.

Referring to FIG. 1, a vehicle seat-top storage device 10 is shown. The device 10 is configured as a flexible apron or cover for a vehicle seat and comprises a lower layer 12 of a flexible sheet material that is configured to overlay and conform to portions of the vehicle seat. As shown, the lower layer 12 is defined by left and right side edges 14, 16 that are joined by top and bottom edges, 18, 20. The lower layer 12 includes a base portion 22, configured to overlay a seat base of a vehicle seat, and a backrest portion 24, configured to overlay a backrest of a vehicle seat. In certain embodiments, the lower layer 12 may taper in width along side edges 14, 16 from an area of the base portion 22 to a narrower top end 26 of the backrest portion 24 that terminates at top edge 20.

All or portions of the lower layer 12 may be a flexible fabric material or non-fabric material or a combination of such materials. The layer 12 may be formed as a single continuous piece of such material or may be formed from several pieces of such materials that are joined together to form a continuous piece. The fabric material may be a woven or non-woven fabric material. Non-limiting examples of fabric materials suitable for the layer 12 include manmade or polymeric fabrics, such as polyester, polyamide, nylon, aramid, polypropylene, polyethylene, high-density polyethylene (HDPE), low-density polyethylene (LDPE), polyurethane, acrylic, vinyl, PVC, rayon, spandex, fiberglass, carbon fiber, etc. Natural fabric materials may also be used, such as cotton, wool, silk, linen, hemp, bamboo, etc. Non-limiting examples of non-fabric materials for the layer 12 may include flexible polymeric sheet materials such as polypropylene, polyethylene, HDPE, LDPE, vinyl, PVC, silicone, neoprene, foam, etc. A combination of different fabrics and/or non-fabric materials may also be used for all or portions of the lower layer 12.

All or portions of the lower layer 12 may be non-elastic or non-stretchable. In other embodiments, however, all or portions of layer 12 may be elastic or stretchable. Additionally, all or portions of the lower layer 12 may be liquid impervious or liquid resistant so that liquids cannot pass or readily seep through the material. This may include liquid-impermeable or liquid-resistant fabrics materials or liquid-permeable fabric materials that have been treated or coated with a liquid impervious or liquid resistant material so that the fabric material is liquid impervious or liquid resistant. Non-limiting examples of suitable liquid-impervious or liquid-resistant fabric materials, coatings and treatment materials for the flexible lower layer 12 may include nylon, synthetic or natural rubber, neoprene, Gore-Tex® or expanded polytetrafluoroethylene (ePTFE) fabric, vinyl, PVC, silicone, wax, acrylic, fluoropolymer, oilcloth, polyurethane, etc. In other embodiments, all or portions of the lower layer 12 may be liquid permeable. All or portions of the upper surface of the lower layer 12, particularly the base portion 22, may be texturized, coated or be otherwise provided with a non-slip surface or surface areas. This non-slip surface may be formed from the material of the lower layer 12 itself or as a non-slip layer or coating, such as a rubber, silicone, polyurethane, vinyl, etc., which may have non-slip properties themselves or that are texturized or embossed to have such non-slip properties. Non-slip tape, strips, or layers may also be applied to the surfaces of the lower layer 12 to provide the non-slip properties.

The device 10 further comprises an upper layer 28 of a flexible material that is defined by left and right side edges 30, 32 that are joined by top and bottom edges 34, 36. The upper layer 28 is coupled along its side edges 30, 32, 34, 36 to the lower layer 12 along its side edges 14, 16, 18, 20. The upper layer 28 may have a size, shape or configuration that generally corresponds to that of the lower layer 12. This includes a base portion 38 that generally overlays the base portion 22 of the lower layer 12 and a backrest portion 40 that generally overlays the backrest portion 24 of the lower layer 12. The upper layer 28 also tapers in width from the base portion 38 to a narrower end 42 that terminates at the top side edge 34 at the top of the backrest portion 40 to correspond to the taper of the lower layer 12.

The materials of the upper layer 28 may be the same or different than those previously described for the lower layer 12. In particular embodiments, however, the upper layer 28 may be formed from a different material. The upper layer 28 may be of an elastic material to allow the upper layer to stretch or expand, and contract. This may include a spandex material or spandex-containing materials. The spandex-containing materials may include fabric formed from blends of spandex with other materials, such as polyester, nylon, cotton, polypropylene, polyethylene, polyurethane, acrylic, vinyl (PVC), rayon, etc. In certain embodiments, the lower layer 12 may be formed from these elastic materials, as well. The upper layer 28 should have enough elasticity to allow the layer 28 to expand and contract for the purposes and uses described herein, such as conforming to seats of different sizes and shapes and to items that may be stored in the device 10.

The upper layer may be liquid impermeable or resistant or may be liquid permeable. Because the lower layer 12 may have liquid impermeable or resistant characteristics, however, it may not be necessary for the upper layer 28 to have such characteristics to provide a liquid barrier to protect the seat top.

Furthermore, the upper layer or portions thereof may be opaque so that one cannot see through the material of the upper layer. This may obscure items that may be stored within the device 10 so that they cannot be seen from the exterior of the device 10. In other instances, all or portions of the upper layer 28 may be transparent or translucent.

In some embodiments, the lower layer 12 and/or upper layer 18, or portions thereof, may be formed from one or more layers of material. In certain applications, an insulating material may be used for one or more layers forming the lower layer 12 and/or upper layer 18, or portions thereof. The insulated layers 12 and/or 18 may allow the device 10 to be used for keeping items, such as food items, warm or cold while they are stored in the device 10.

In the device 10, the upper layer 28 has an opening 44. The opening 44 is shown as being a transverse slit or slot formed in the upper layer 28 that may extend across all or a portion of the width of the upper layer 28. The opening 44 may be located generally around or near the center of the upper layer 28 or formed in the base portion 38 or backrest portion 40 or near or at the junction of the base portion 38 and backrest portion 40. The opening 44 is shown extending all the way to the right-side edge 32. A closure device 46 is provided with the upper opening 44 for selectively opening and closing the upper opening 44. The closure device 46 may include, but is not limited to, a zipper, a hook and loop fastener (e.g., Velcro®), snaps, buttons, buttons and loops, magnets, ties, toggles and cords, etc. In the embodiment shown, the closure device 46 constitutes a zipper assembly that opens the opening 44 from the right-side edge 32 towards the opposite left-side edge 30.

Figure 2:
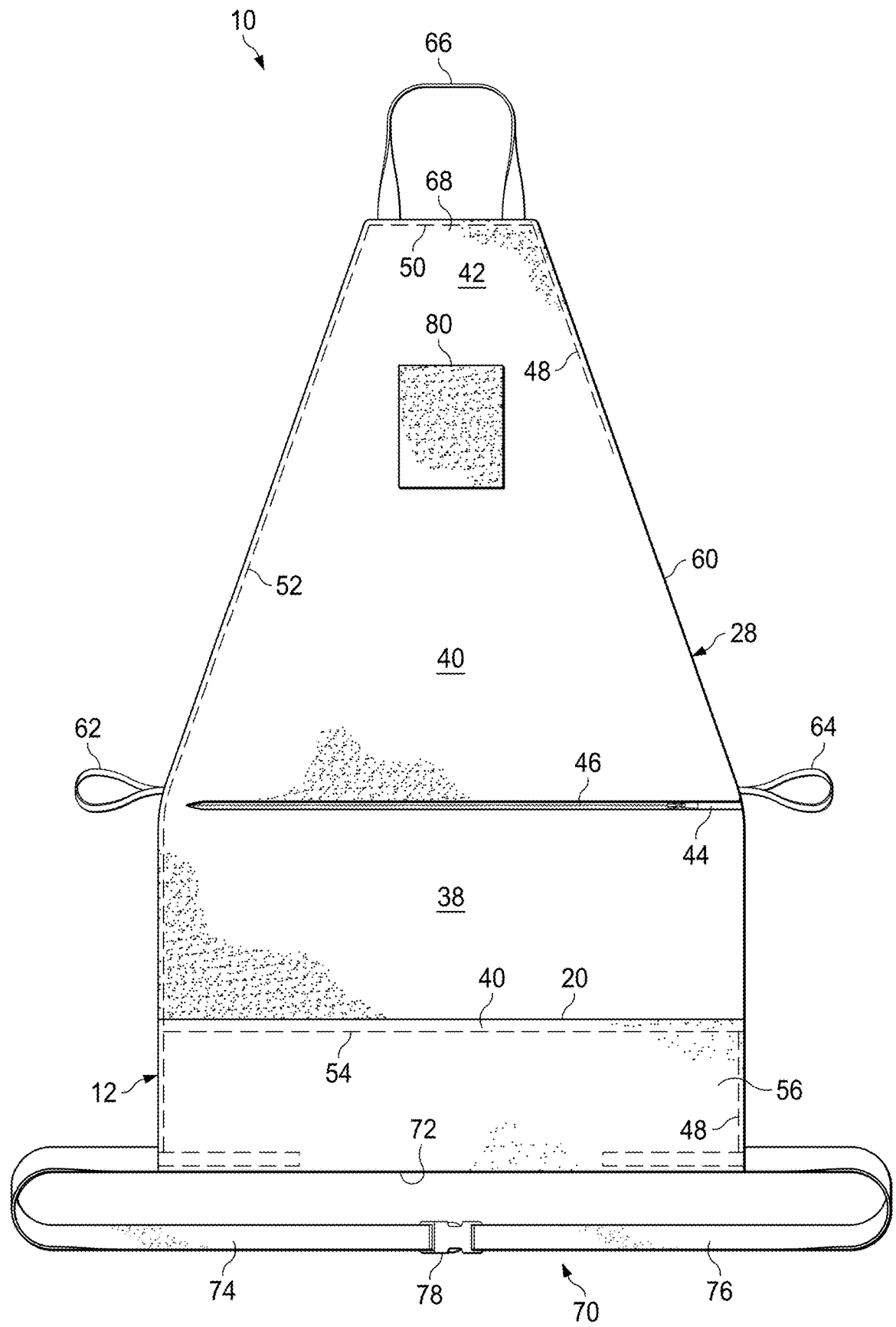
FIG. 2 is a top plan view of the seat-top storage device of FIG. 1, shown assembled with an upper opening of the device in a closed condition.

Referring to FIG. 2, the upper layer 28 is joined around its perimeter along its side edges 30, 32, 34, 36 to the perimeter of the lower layer 12 along side edges 14, 16, 18, 20, respectively, by seams 48, 50, 52, 54. The seams 48, 50, 52, 54 may include permanent or non-permanent fastening methods. Examples of fastening methods for joining the layers together to form the seams include, but are not limited to, stitching, adhesive, glue, welding (e.g., ultrasonic, heat welding, etc.), double-sided tape, stapling, rivets, snaps, hook and loop fasteners, etc. Any or all of the seams 48, 50, 52, 54 may be liquid tight so that liquids cannot seep through the seams. In other instances, any or all of the seams 48, 50, 52, 54 may not be liquid tight.

In the embodiment shown, an extended bottom portion 56 that extends along the length of bottom side edge 20 of the base 22 of the lower layer 12 is folded upward to join the bottom side edge 36 of the upper layer 28, where it is joined at line or seam 54. Where the lower layer 12 is formed from a liquid impermeable or liquid resistant material, this facilitates catching and holding any liquid run off that would otherwise pass through the upper layer 28, which may be formed from liquid permeable or resistant materials. In addition to the extended and folded bottom portion 56 of lower layer 12, in certain embodiments, the lower layer 12 may be slightly larger or have a larger footprint than the upper layer 28 so that extended portions of the lower layer 12 are provided around all or a portion of its perimeter along the side edges 14, 16 and top edge 18. These extended areas may also be upturned and joined along the perimeter of the upper layer 28 so that the lower layer 12 has a bowl-like configuration. This also facilitates catching and holding any liquid run off that would otherwise pass through the upper layer 28, which may be formed from liquid permeable materials.

The area between the lower and upper layers 12, 28 form an interior space 58 (FIG. 3) of the storage device 10. In some instances, the interior space 58 is a continuous interior space that extends the full or a major portion of the length and width of the device 10 between the lower and upper layers 12, 28. As used herein, "major portion" should be construed as being from 50% or greater. In some embodiments, the continuous interior space 58 may extend from at least, equal to, and/or between any two of 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 92 wt %, 93 wt %, 94 wt %, 95 wt %, 96 wt %, 97 wt %, 98 wt %, 99 wt % and 100% of the length and width of the device 10.

In certain embodiments, the seams 48, 50, 52, 54 may close off the entire perimeter of the layers 12, 28. In the embodiment shown, however, a portion of the right-side edge 32 of the upper layer 28 and a corresponding portion of the right-side edge 16 of the lower layer are not joined or coupled together along the full length of the side edges 14, 30. This area may be located at or around the middle of the device 10. This facilitates forming a side opening 60 along a right-side edge of the device 10. In many applications, the storage device 10 will be used on the passenger seat of vehicle. With a driver seated on the left side of the vehicle adjacent to the passenger seat, the driver can readily access the interior space 58 of the storage device 10 through this right-side opening 60. In other embodiments, the opening 60 may be located on the left side of the device 10, in instances where the driver seat may be located on the right side of the vehicle. The device 10 may also be used on back seats of the vehicle.

The upper opening 44 formed in the upper layer 28 may extend all the way to the right-side edge 32 so that it meets the side opening 60 in certain embodiments. This may allow an even larger opening to be formed in combination with the side opening 60 by opening the upper opening 44 to facilitate positioning of larger items or articles within the interior space 58. In other embodiments, the upper opening 44 may not extend all the way to the side opening 60.

Referring to FIGS. 1 and 2, various securing devices are provided for securing the storage device 10 to the vehicle seat. Although the securing devices may be shown coupled to the upper layer 28 in FIG. 1, they may also be coupled to the lower layer 12 or to both the lower and upper layers 12, 28. The securing devices may include side-securing straps 62, 64 located on one or both sides of the device 10, such as along the opposite side edges 14,16 of the upper layer 28. The straps 62, 64 are configured as flexible loops and may be of elastic or non-elastic material.

A headrest securing strap 66 is provided at the top end 68 of the of the device 10 for securing to a headrest of a vehicle seat. The securing strap 66 is sized and configured as a loop to loop over or pass around the seat headrest. The strap 66 may be formed from a single strap that loops over the headrest. Alternatively, the securing strap 66 may be formed from a pair of straps or strap segments that releasably couple together around the headrest, such as by buckles, quick-release buckles, D-rings, ties, hook and loop fasteners, ties, snaps, magnets, etc. The strap 66 may be formed from an elastic or non-elastic material.

A seat-base strap 70 is provided at the bottom 72 of the device 10, as shown in FIG. 2. The seat-base strap 70 is sized and configured to pass around the seat base or seat-base frame of the vehicle seat. In the embodiment shown, the strap 70 is coupled to opposite sides of the lower layer 12 at or near to where the extended portion 56 joins the rest of the lower layer 12. The seat-base strap 70 is formed from a pair of strap segments 74, 76 that releasably couple together by a buckle 78, such as a quick-release buckle, or other fastening devices, such as those previously described for securing strap 66. The strap segments 74, 76 may be elastic or non-elastic. One or both of the strap segments 74, 76 may be adjustable in length, such as with an adjustable buckle, to accommodate different size seat bases. Alternatively, or in addition to the adjustability, if the strap segments 74, 76 are elastic, the elasticity of the segments 74, 76 may allow sufficient expansion or contraction to accommodate different size seat bases.

The seat strap segments 74, 76 are passed through the side straps 62, 64, respectively. The side straps 62, 64 are not stationarily secured or coupled to the strap segments 74, 76, but are movable along the length of each segment 74, 76. This facilitates collapsing and deployment of the seat storage device 10.

One or more additional storage compartments may also be provided on the device 10. This may include one or more compartments 80, such as pockets, coupled to the upper layer 28 in an area that is accessible during use. The compartment 80 may be formed from an additional layer of flexible material, such as fabric, that is coupled along its side edges to the upper surface of the upper layer 28 by various methods. This may include, but is not limited to, stitching, adhesive, glue, welding (e.g., ultrasonic, heat welding, etc.), double-sided tape, stapling, rivets, snaps, hook and loop fasteners, etc. Alternatively, an opening or slot may be formed in the upper layer 28 and a container or pocket may be secured around the perimeter of such opening or slot to form the compartment 80. In this configuration, items are passed through the opening or slot formed in the upper layer 28 and received in the secured compartment or pocket. The compartment 80 may be used for holding smaller items, such as mobile phones, pens or pencils, note pads, documents, etc.

Figure 4:
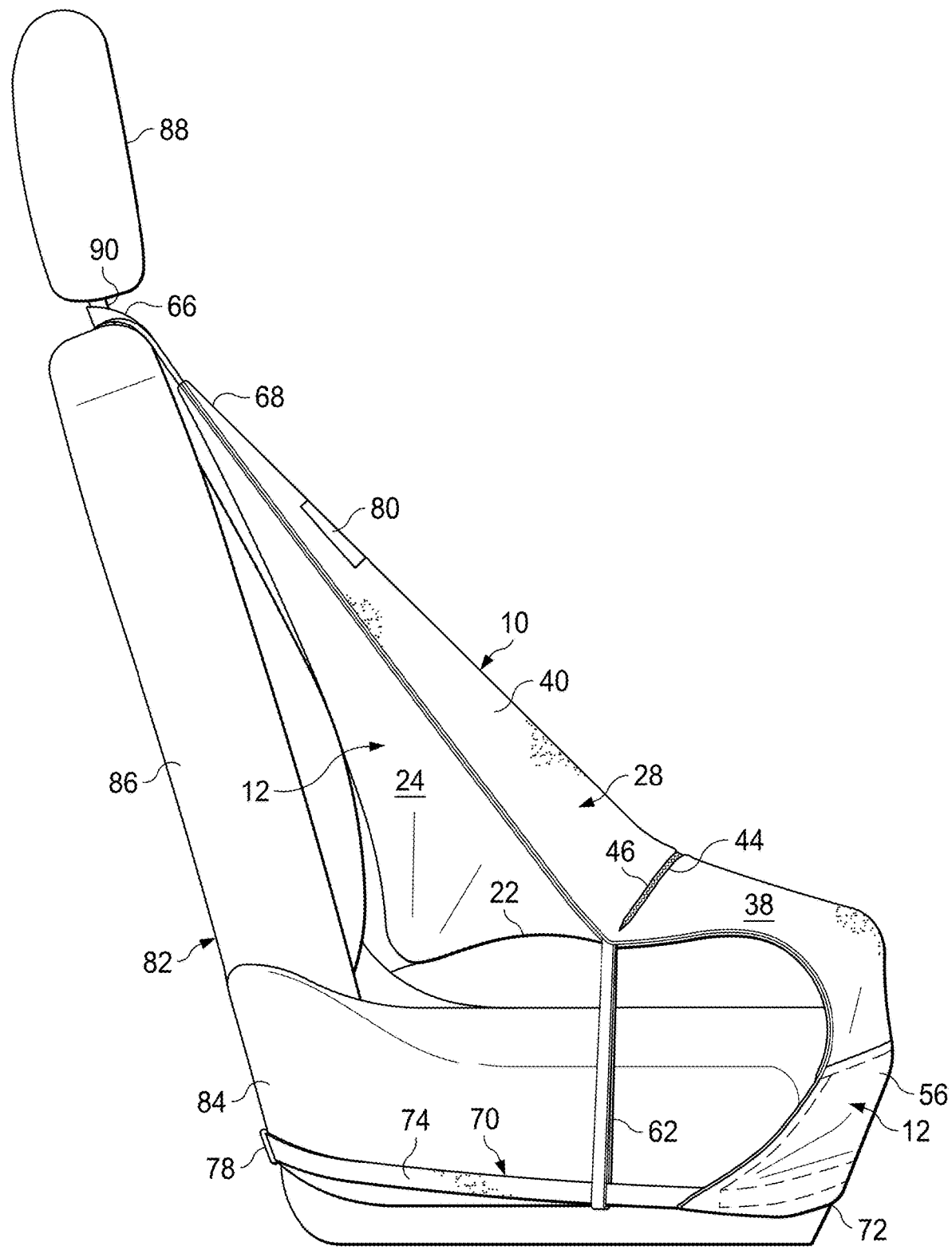
FIG. 4 is a left-side elevational view of the seat-top storage device and vehicle passenger seat of FIG. 3, with an upper opening in the closed condition.

Referring to FIG. 4, a vehicle seat 82 is shown with which the seat-top storage device 10 may be used. The vehicle seat 82 may be conventional in design and typically includes a seat base 84, a backrest 86 that extends upward from the rear of the seat base 84, and a headrest 88 that extends from the top of the backrest 86. The headrest 88 may be adjustably mounted to the backrest 86 through one or more support members 90, such as metal rods or bars, that allow the headrest 90 to raised, lowered or removed.

In use, the seat-top storage device 10 is secured to the seat 82 by passing or securing the headrest strap 66 over or around the headrest 88. In some instances, it may be desirable to position the headrest strap 66 around the bottom of the headrest 88 or around the support members 90 where the headrest 88 is coupled to the backrest 86.

The bottom portion 72 of the device 10 is positioned so that it overlays the front of the seat base 84 and extends across the width of the seat base 84, as shown in FIG. 4.

Figure 5:
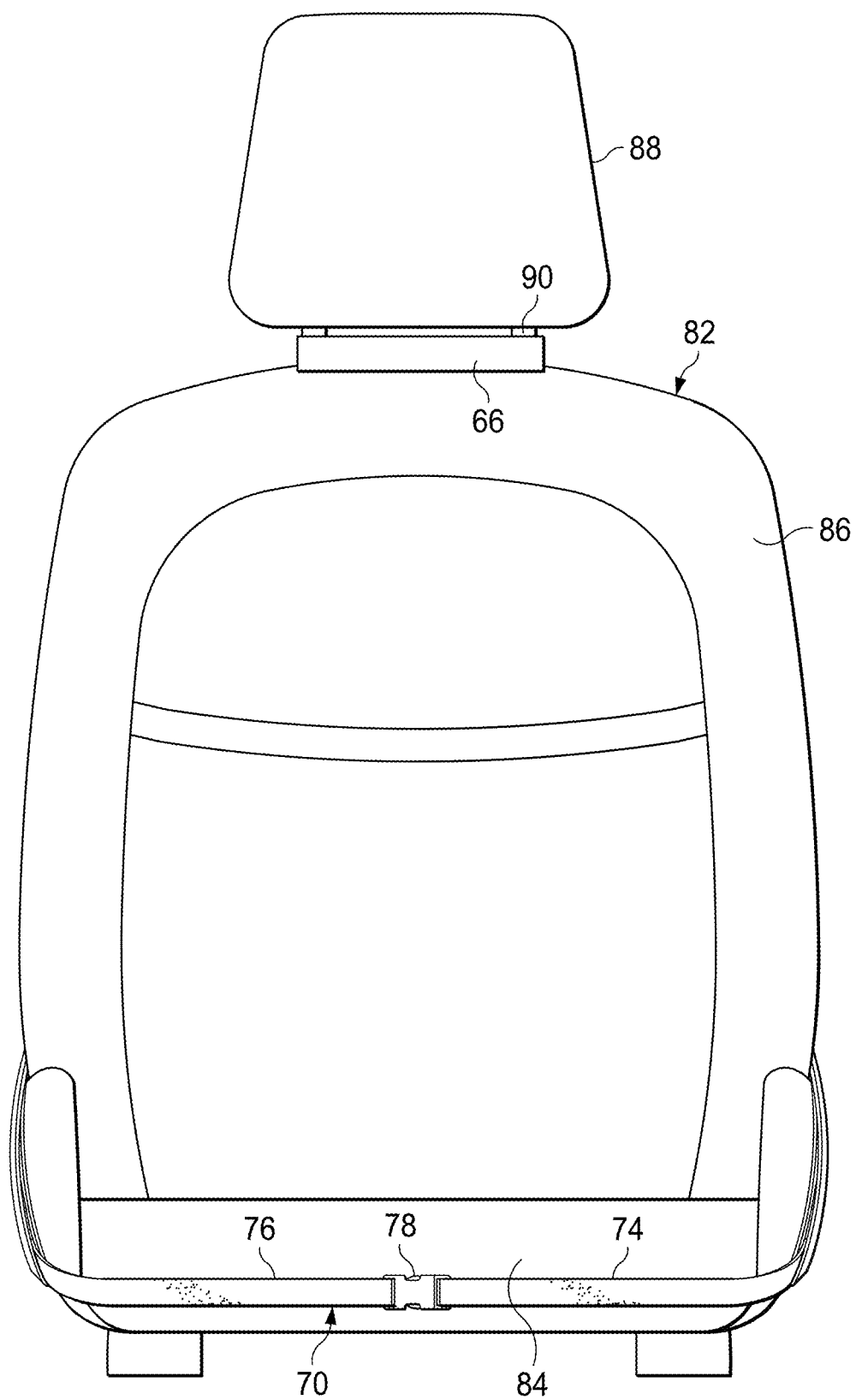
FIG. 5 is a rear elevational view of the vehicle passenger seat of FIG. 3, shown with a seat-base securing strap of the seat-top storage device secured to the vehicle seat for securing a lower portion of the device to the vehicle passenger seat.

The two strap segments 74, 76 of the seat-base strap 70 are passed through the side-securing straps 62, 64, respectively, along either side of the seat base 84, or around the supporting structure or frame supporting the seat 82, and secured together by buckle or other coupling device 66 to the rear of the seat 82, as shown in FIG. 5. The device 10 does not interfere with the seat controls or adjustment of the seat 82 and the seat can be used in a normal fashion. In other embodiments, the side-securing straps 62, 64 may be secured to structures along the sides of the seat base 84.

Figure 6:
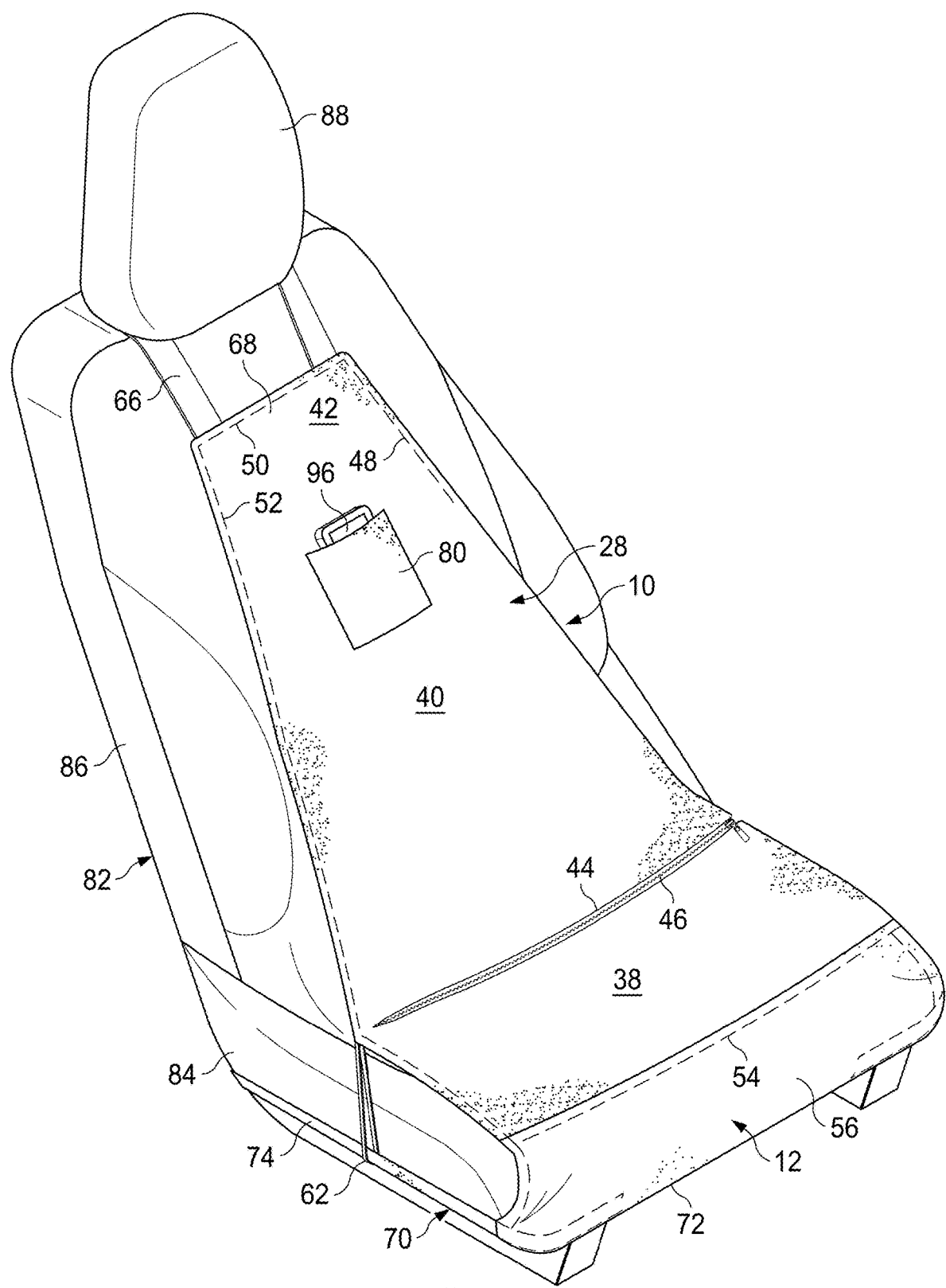
FIG. 6 is a left front perspective view of the seat-top storage device of FIG. 3, shown employed on the vehicle passenger seat, with the upper opening in a closed condition
Figure 7:
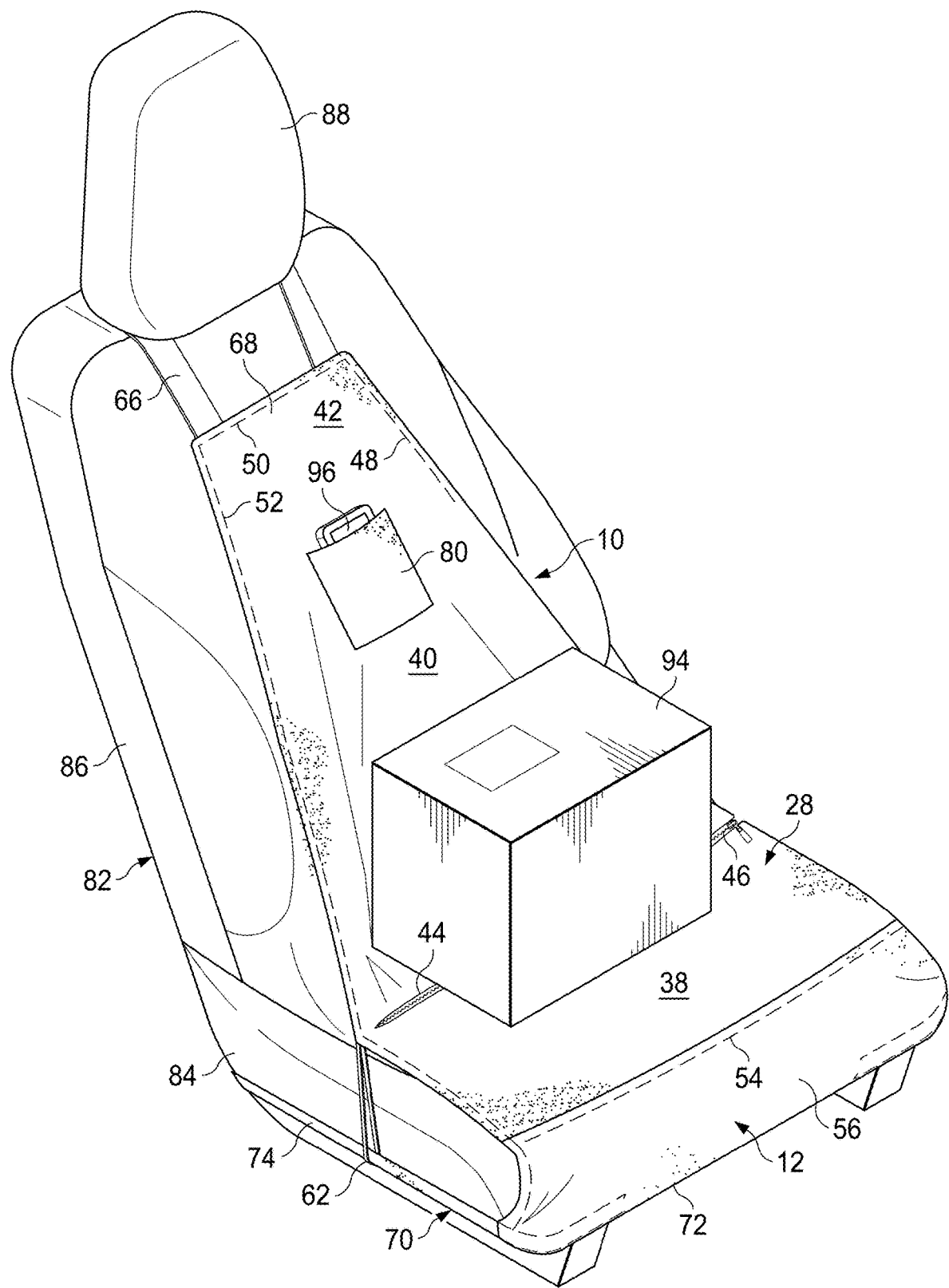
FIG. 7 is a left front perspective view of the seat-top storage device of FIG. 3, shown employed on the vehicle passenger seat illustrating how items can be stored on top of the device in one mode of operation.

With the seat-top storage device 10 secured to the vehicle seat 82, the seat-top storage device 10 may be in an initial closed and empty condition. In the closed condition, the opening 44 of the upper layer 28 is closed off by the closure device or zipper 46, as shown in FIG. 6.

Figure 8:
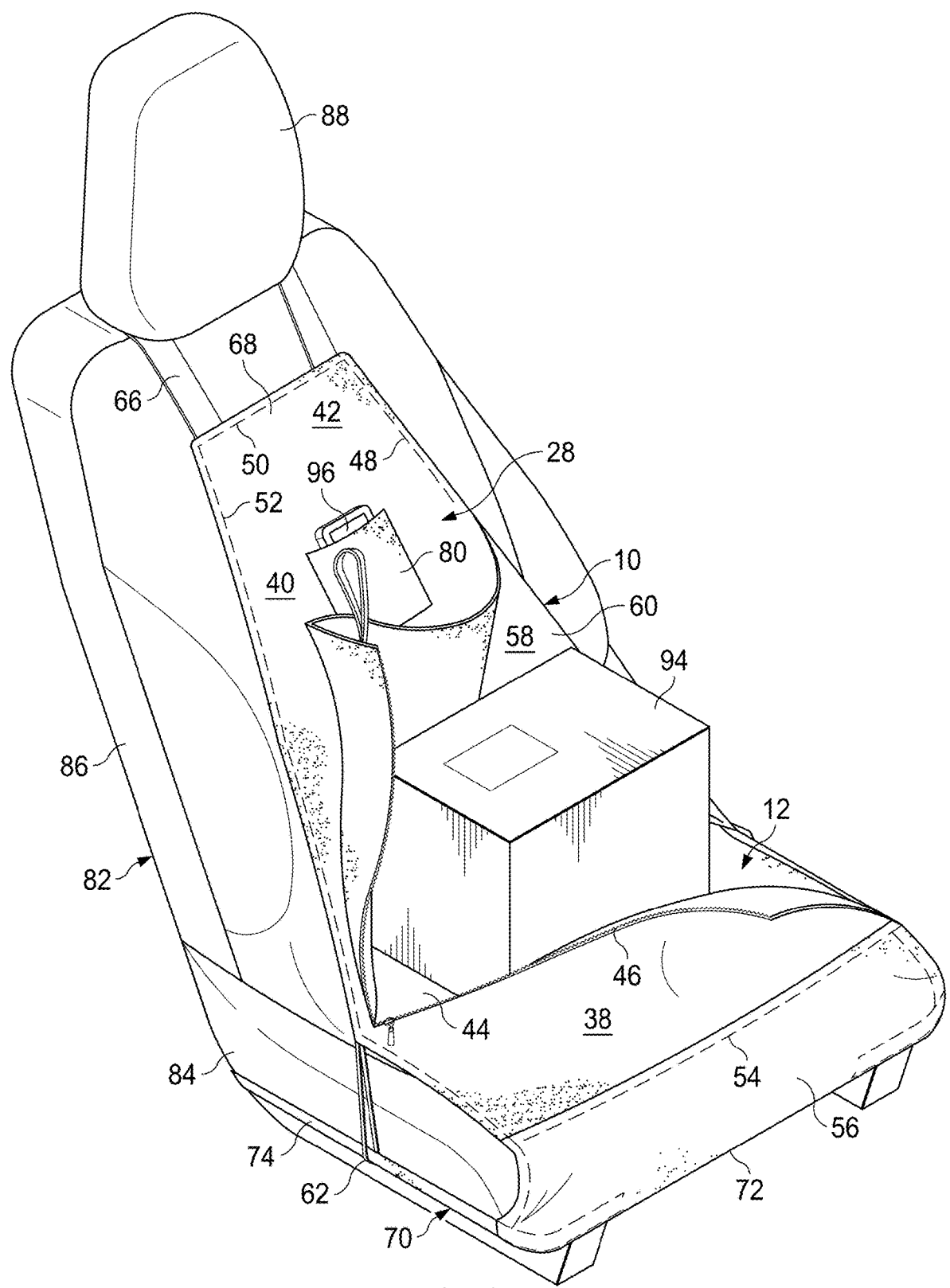
FIG. 8 is a left front perspective view of the seat-top storage device of FIG. 3, shown employed on the vehicle passenger seat with the upper opening of the device being in an open condition so that an article can be placed in an interior space of the device in another mode of operation.

To store items or articles within the interior 58 of the device 10 between the lower and upper layers 12, 28, in some instances, an item or article may be merely passed through the side opening 60 without having to open the upper opening 44. This may be easily done by the driver with the use of one hand. If there is no side opening 60 or one wants to utilize the upper opening 44, the upper opening 44 may be opened, as shown in FIG. 8. Again, opening and closing of the zipper or closure device 46 may easily be accomplished by the driver with only one hand. The item or article 92 may then be positioned on upper surface of the lower layer 12 on the top of the seat base 84. The upper opening 44 may then be closed by closing the closure device 46.

Figure 9:
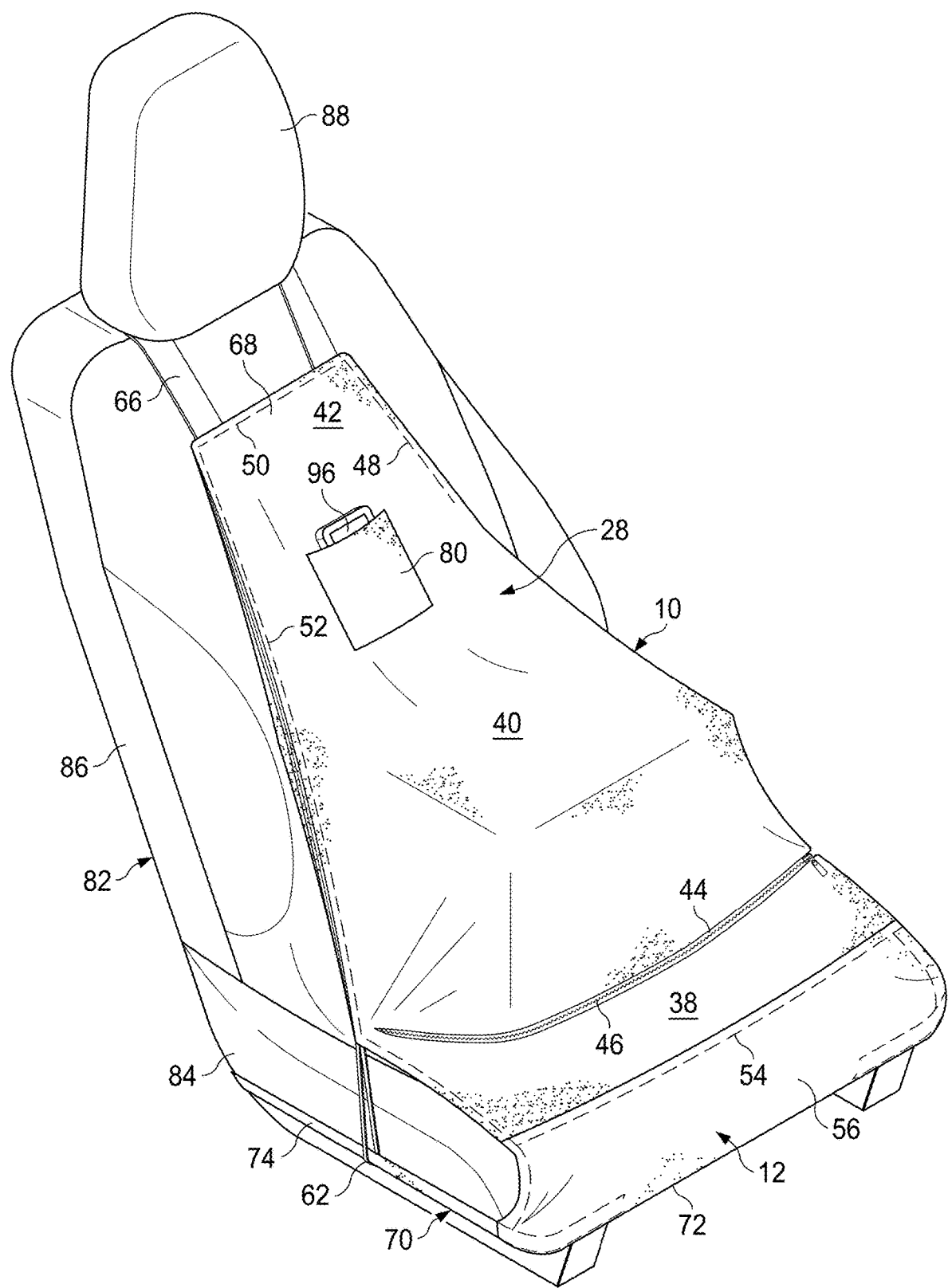
FIG. 9 is a left front perspective view of the seat-top storage device and vehicle passenger seat of FIG. 8, shown with the article positioned within the interior space and the upper opening in a closed condition.

Because the upper layer 28 may be formed from an elastic material, it can stretch to accommodate larger items or articles, as shown in FIG. 9. Additional items or articles, such as mobile phone 96 may also be stored in the storage compartment 80.

Figure 3:
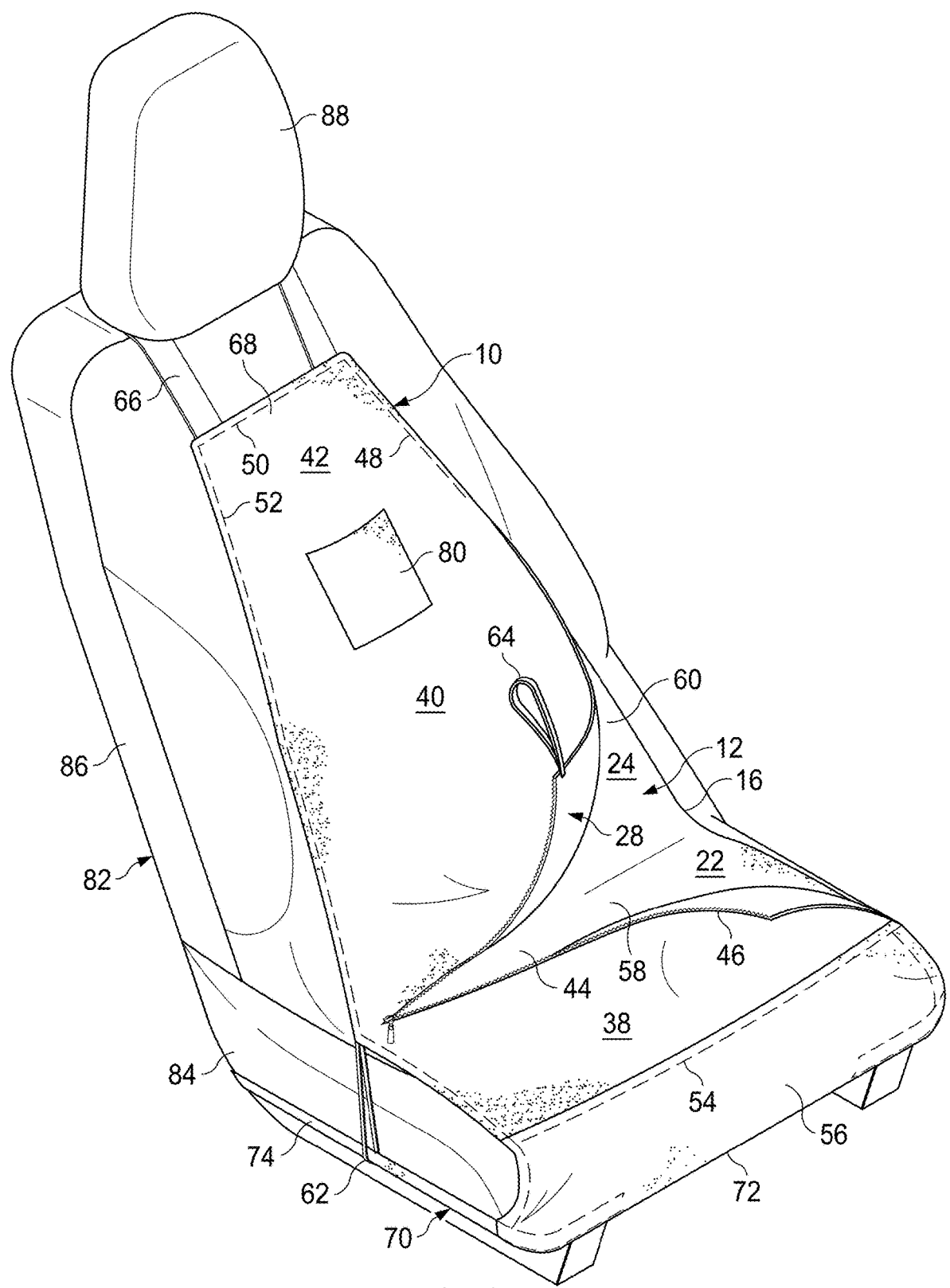
FIG. 3 is a left front perspective view of the seat-top storage device of FIG. 2, shown employed on a vehicle passenger seat with the upper opening in an open condition.

The seat-top storage device 10 also serves in protecting the vehicle seat 82 surface from dirt and spills. Because the lower layer 12 and/or the upper layer 28 may be formed from liquid impermeable or liquid resistant materials, spilled liquids are prevented from passing through the materials and onto the seat 82. As shown in FIGS. 3 and 4, where the upper layer 28 is liquid permeable and the lower layer 12 is liquid impermeable or resistant, if spilled liquids are spilled on the upper layer 20, the liquids may pass through the upper layer 28 where they collect on the lower layer without passing to and damaging the surfaces of the vehicle seat 82. The spilled liquids may then reside on the lower layer 12 until they can be removed. The extended portion 56 of the lower layer 12 that is folded upward to join the lower layer 28 forms a pocket that helps collect any spilled liquids flowing over the lower layer 12 that may flow to the front of the seat 82. In embodiments where the lower layer 12 has a larger footprint than the upper layer 28 so that the side edges 14, 16, and optionally top edge 12, are folded upward to form a bowl-like configuration, this also facilitates catching and holding liquids on the surface of the lower layer 12 so that they do not contact surfaces of the vehicle seat 82.

When the device 10 no longer needs to be used on the vehicle seat 82, a user can uncouple the headrest strap 66 from the headrest 88 and pull the top portion of the device 10 down while the seat-base strap 70 remains secured to the seat base 84. The top unsecured portion of the device 10, which may constitute a majority of the device 10, can then be stored underneath the front of the vehicle seat 82. The seat-base strap 70 does not need to be extremely tight and may have some degree of slack or elasticity around the seat base 84 as along as the strap 70 does not become detached or easily dislodged during use. Such slack or elasticity may facilitate the device 10 being stored under the seat 82 while still being secured to the seat base 84. Because the side straps 62, 64 are not stationarily secured or coupled to the strap segments 74, 76, they can move along the length of each seat-base strap segment 74, 76 as it is being collapsed.

When it is desired to use the device 10 again, the user can merely pull the device 10 up from under the vehicle seat 82 so that it overlays the seat 82 and couple the headrest strap 66 to the headrest 88, as previously described.

In other instances, the device 10 may be completely removed from the vehicle seat 82 by uncoupling the straps 66 and 70 so that the device 10 is completely uncoupled from the seat 82. The device 10 may then be stored under vehicle seat 82, the glove compartment, center console or other area of the vehicle. In certain embodiments, a storage container or case (not shown) may be provided with the device 10 for storage of the device. In some applications, a vehicle may be manufactured with seats configured to accommodate the storage device. In such instances, a storage area or compartment for storing the device 10 may be provided in the vehicle or vehicle seat itself for storing the device 10 when it is not in use.

Figure 10:
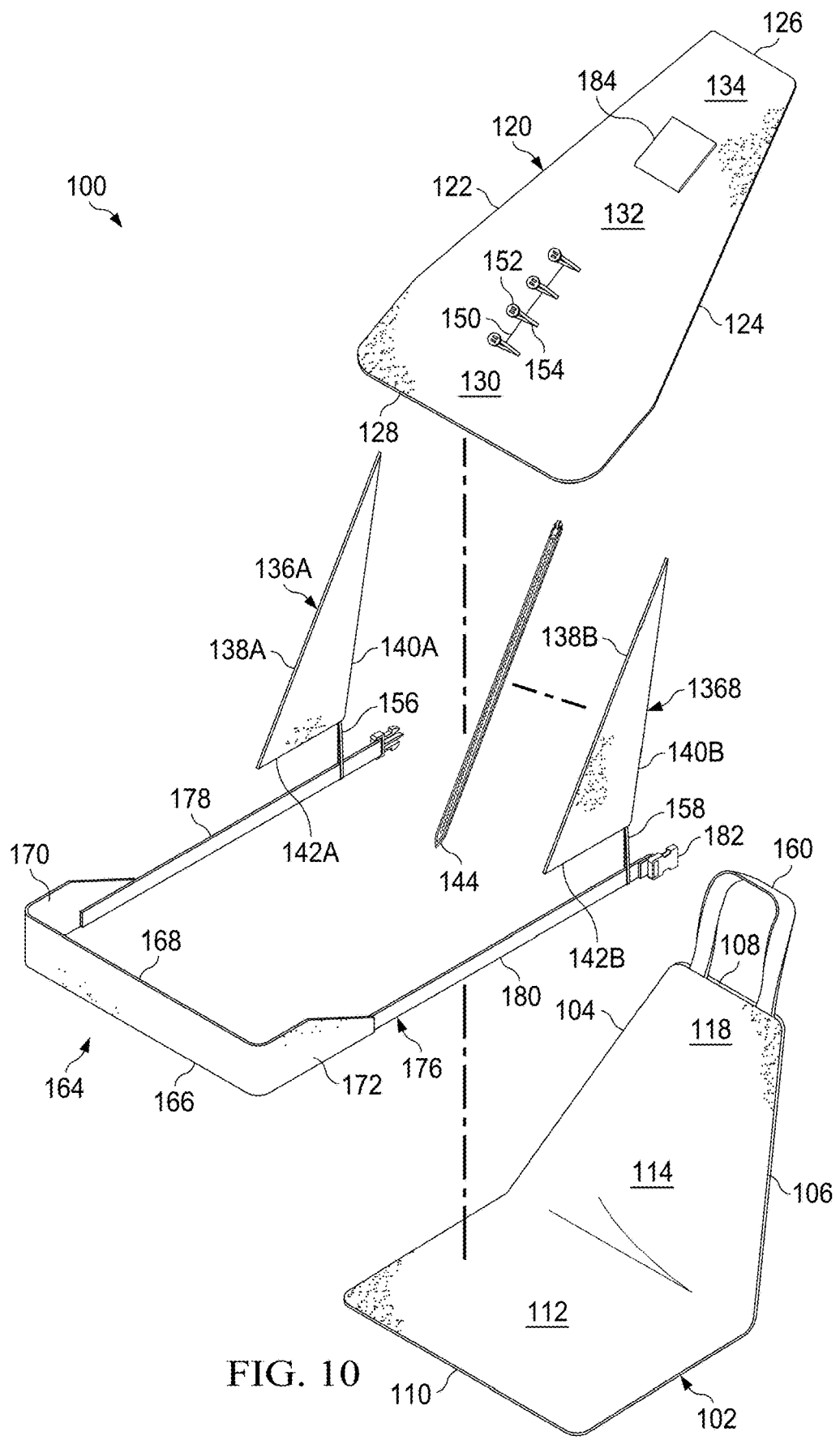
FIG. 10 is an exploded, perspective view of another embodiment of seat-top storage device constructed in accordance with particular embodiments of the disclosure.

Referring to FIG. 10, another embodiment of a vehicle seat-top storage device 100 is shown. The device 100 is configured similarly to the device 10 and comprises a lower layer 102 of a flexible sheet material that is configured to overlay and conform to portions of the vehicle seat. As shown, the lower layer 102 is defined by left and right side edges 104, 106 that are joined by top and bottom edges, 108, 110. The lower layer 102 includes a base portion 112, configured to overlay a seat base of a vehicle seat, and a backrest portion 114, configured to overlay a backrest of a vehicle seat. In certain embodiments, the lower layer 102 may taper in width along side edges 104, 106 from an area of the base portion 112 to a narrower top end 118 of the backrest portion 114 that terminates at top edge 108.

The materials of the lower layer 102 may be the same or similar to those of the lower layer 12 of the device 10, previously described, and may have liquid impermeable or resistant characteristics, as well as the texturized, coated or be otherwise provided with a non-slip surface, such as those of the lower layer 12.

The device 100 further comprises an upper layer 120 of a flexible sheet material that is defined by left and right side edges 122, 124 that are joined by top and bottom edges 126, 128. The upper layer 120 may have a size, shape or configuration that generally corresponds to that of the lower layer 102. This includes a base portion 130 that generally overlays the base portion 112 of the lower layer 102 and a backrest portion 132 that generally overlays the backrest portion 114 of the lower layer 102. The upper layer 120 also tapers in width from the base portion 130 to a narrower end 134 that terminates at the top side edge 126 at the top of the backrest portion 132.

The materials of the upper layer 120 may be the same or similar to the materials of the upper layer 28 of device 10, previously described. This may include the elastic materials, liquid impermeable or liquid resistant materials, liquid permeable materials, opaque or non-see-through materials, transparent or translucent materials, as was described for the materials of the upper layer 28.

The device 100 of FIGS. 11-17 differs from the device 10 in that includes a pair of left and right side gusset panels 136A, 136B, respectively, through which the lower and upper layers 102, 120 are coupled together along their left and right side edges 104, 122, 106, 124. As shown in FIG. 10, each of the gusset panels 136A, 136B has the same or a similar triangular shape or configuration, although the gusset panels 136A, 136B can have other shapes, such as rectangular, quadrangular, polygonal, etc., as well. In the embodiment shown, the triangular gusset panels 136A, 136B, have an upper edge 138A, 138B, a back or rearward edge 140A, 140B, and a lower or bottom edge 142A, 142B. The upper edges 138A, 138B of the panels 136A, 136B form the longer or hypotenuse edge of the triangle and are joined to the left and right side edges 122, 124, respectively, of the upper panel 120. This is generally along all or a portion of the backrest portion 132 of the upper layer 120. In some embodiments, the upper edges 138A, 138B may extend further along all or a portion of the side edges of the base portion 130, as well.

The rearward edges 140A, 140B of the panels 136A, 136B are joined along the side edges 104, 106, respectively, of the lower layer 102. This is generally along all or a portion of the backrest portion 114 of the lower layer 102. The bottom edges 142A, 142B are joined to the side edges 104, 106 of the rear of the base portion 112 of the lower layer. The bottom edges 142A, 142B extend along only a portion of the length of the base portion 112 of the lower layer so that they terminate rearward of the forward edge 110 of the lower layer 102. In such instances, the forward end of the base portion 112 of the lower layer 102 may be joined directly along the bottom edge 110 and side edges 104, 106 to the bottom edge 128 and side edges 122, 124 of the forward end of the base portion 130 of the upper layer 120. In other embodiments, the bottom edges 142A, 142B of the gusset panels 136A, 136B are joined to the side edges 104, 106 of the base portion 112 and extend the full length of the base portion 112, terminating at the forward edge 110. The edges of the various layers and/or panels may be joined by seams, such as those various seams 48, 50, 52, 54, as previously described for the device 10.

In the embodiment shown, the upper edge 138B of right gusset panel 136B is joined to the side edge 124 of the upper layer 120 through a zipper assembly 144. The zipper assembly 144 may extend along all or a portion of the length of the upper side edge 138B of the gusset panel 136B and be joined to the corresponding right side edge 124 of the upper layer 120. In some embodiments, the zipper assembly 144 may further extend along the right side 124 of the upper layer where it is joined to the lower layer 102 so that the zipper assembly 144 extends along the entire length of the side edge 124 of the upper layer 120.

Figure 11:
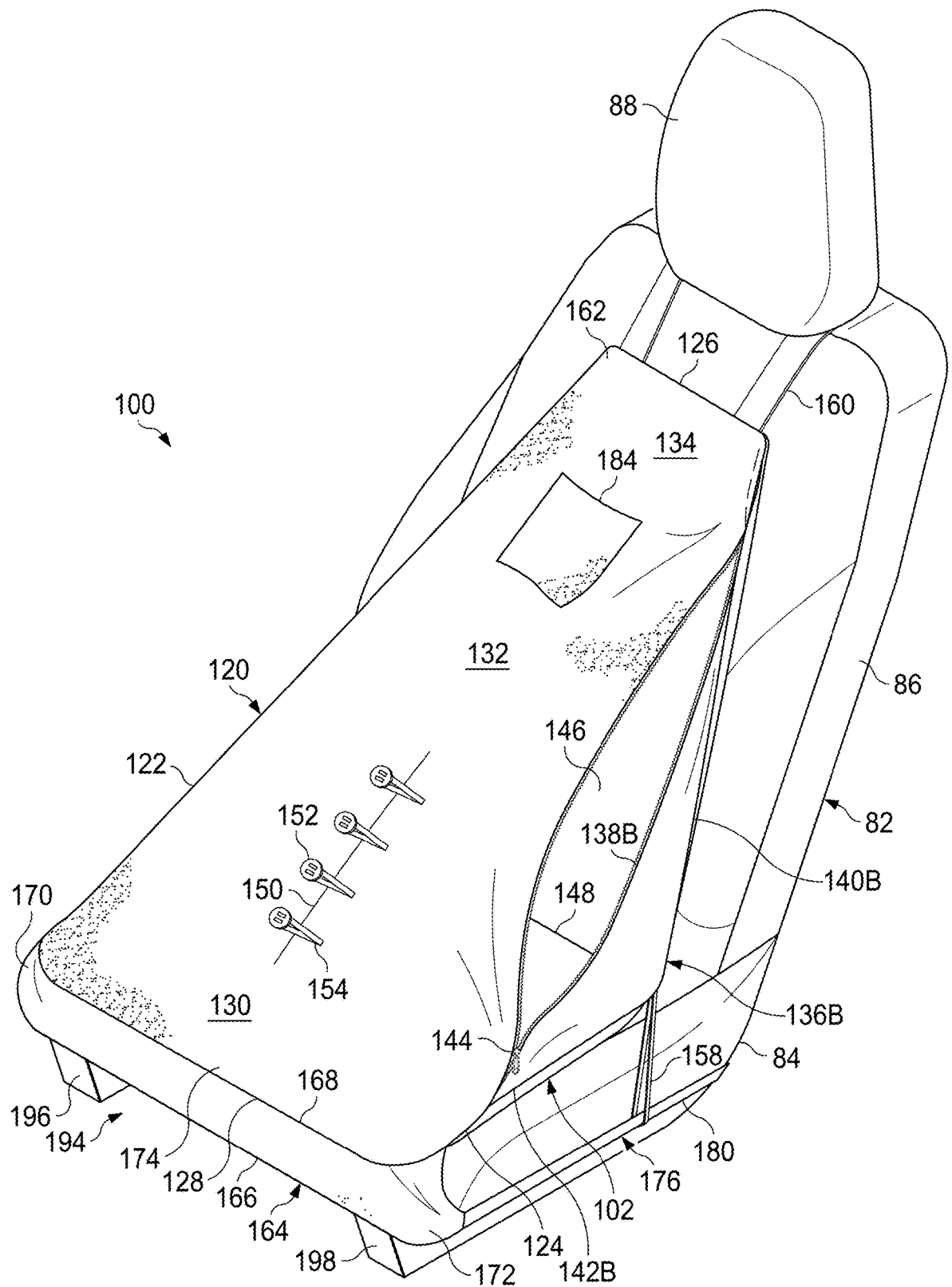
FIG. 11 is a right front perspective view of the seat-top storage device of FIG. 10, shown employed on a vehicle passenger seat with the side opening in an open condition.

The zipper assembly 144 allows the side edge 124 of the upper layer 120 to be selectively separated from the gusset panel 138B and/or side edge 106 of lower layer 102 to form an opening 146, as shown in FIG. 11, to access an interior space 148 of the device 100 between the lower and upper layers 102, 120. In some instances, the interior space 148 is a continuous interior space that extends the full or a major portion of the length and width of the device 100 between the lower and upper layers 102, 120. In some embodiments, the continuous interior space 148 may extend from at least, equal to, and/or between any two of 50 wt %, 51 wt %, 52 wt %, 53 wt %, 54 wt %, 55 wt %, 56 wt %, 57 wt %, 58 wt %, 59 wt %, 60 wt %, 61 wt %, 62 wt %, 63 wt %, 64 wt %, 65 wt %, 66 wt %, 67 wt %, 68 wt %, 69 wt %, 70 wt %, 71 wt %, 72 wt %, 73 wt %, 74 wt %, 75 wt %, 76 wt %, 77 wt %, 78 wt %, 79 wt %, 80 wt %, 81 wt %, 82 wt %, 83 wt %, 84 wt %, 85 wt %, 86 wt %, 87 wt %, 88 wt %, 89 wt %, 90 wt %, 92 wt %, 93 wt %, 94 wt %, 95 wt %, 96 wt %, 97 wt %, 98 wt %, 99 wt % and 100% of the length and width of the device 100.

In some embodiments, the lower layer 102, upper layer 120, and/or gusset panels 136A, 136B, or portions thereof, may be formed from one or more layers of material. In certain applications, an insulating material may be used for one or more layers forming the lower layer lower layer 102, upper layer 120, and/or gusset panels 136A, 136B, or portions thereof. The insulated layers may allow the device 100 to be used for keeping items, such as food items, warm or cold while they are stored in the device 100.

With the device 100 employed with a vehicle passenger seat, the opening 146 is located along a right side edge of the device 100 that will typically be located on the driver's side so that the driver can access the opening 146. In other embodiments, such as where the driver's seat is located on the right side of the vehicle, the opening 146 may be located on the left side of the device 100.

An additional upper opening 150 (FIG. 12) is formed in the upper layer 120 to access the interior space 148. The opening 150 may be the same or similar to the opening 44 of device 10, extending transversely across all or a portion of the width of the upper layer 120. In the embodiment shown, however, the opening 150 is formed as a longitudinal slit or slot that extends vertically or lengthwise along all or a portion of the length of the upper layer 120. The opening 150 may be located generally around or near the center of the upper layer 120 or be formed in the base portion 130 or backrest portion 132 or near or at the junction of the base portion 130 and backrest portion 132. The opening 44 may constitute a slit or slot formed in the material of the upper layer 120. A closure device is provided with the upper opening 150 for selectively opening and closing the upper opening 150. The closure device may include, but is not limited to, a zipper, a hook and loop fastener (e.g., Velcro®), snaps, buttons, buttons and loops, magnets, a tie, a toggle and cord, etc. In the embodiment shown, the closure device constitutes a series of longitudinally spaced apart buttons 152 located along one side of the opening 150 with corresponding spaced apart loops 154 located on the opposite side of the opening 150 that loop over the buttons 152 to secure and close the opening 150. The loops 154 may be formed from an elastic material so they provide a degree of flexibility and can expand and contract.

Referring to FIG. 10, various securing devices are provided for securing the storage device 100 to the vehicle seat. The securing devices may include side-securing straps 156, 158 located on one or both sides of the device 100. In the embodiment shown, these are coupled at one end to the bottom edges 142A, 142B of the gusset panels 136A, 136B, respectively, at or near the corner where the rearward edges 140A, 140B join or intersect the bottom edges 142A, 142B, respectively. The straps 156, 158 may be coupled to other areas or components of the device 100, however. The straps 156, 158 may be of elastic or non-elastic material.

A headrest securing strap 160 is provided at the top end 162 of the of the device 100 for securing to a headrest of a vehicle seat. The securing strap 160 may be the same or similar to the securing strap 66 of the device 10. The securing strap 160 is sized and configured to loop over or pass around the seat headrest and may be configured the same or similarly to the strap 60 of the device 10, previously described. In the embodiment shown, the strap 160 is shown coupled to the top end 118 of the lower layer 102, but may be coupled to the top end 134 of the upper layer 120 or both layers 102, 120. The securing strap 160 is sized and configured as a loop to loop over or pass around the seat headrest. The strap 160 may be formed from a single strap that loops over the headrest. Alternatively, the securing strap 160 may be formed from a pair of straps or strap segments that releasably couple together around the headrest, such as by buckles, quick-release buckles, D-rings, ties, hook and loop fasteners, ties, snaps, magnets, etc. The strap 160 may be formed from an elastic or non-elastic material.

The device 100 further comprises a seat-base strap assembly 164. The seat-base strap assembly 164 includes a seat-base apron 166 that is formed from a flexible layer of material configured to extend across the front of the vehicle seat base. The material of the apron 166 may be the same or similar to the materials forming the lower and upper layers 102, 120, and may be elastic or non-elastic. The apron 166 may be a separate piece of material or may be formed from an extended portion of either of the layers 102, 120. In the embodiment shown, the apron 166 is a separate piece of material that is joined at its upper edge 168 along the forward edge of the device 100 where the forward edges 110, 128 of the lower and upper layers 102, 120 are both joined together. Left and right side portions 170, 172 of the apron 166 are configured to extend around either side of the front of the seat base a distance and are joined along the sides of the device 100 where the lower and upper layers 102, 120 are joined along their side edges near the forward end 174 of the device 100.

The seat-base strap assembly 164 further comprises a seat-base strap 176. The seat-base strap 176 may be configured the same or similar to the seat-base strap 70 of the device 10 and may be formed by a pair of strap segments 178, 180. The strap segments 178, 180 are coupled at one end to the left and right side portions 170, 172, respectively, of the bottom of the apron 166. The seat-base strap 176 is sized and configured to pass around the seat base or seat-base frame of the vehicle seat. The strap segments 178, 180 releasably couple together by a buckle assembly 182, such as a quick-release buckle, or other fastening devices, such as those previously described. The strap segments 178, 180 may be elastic or non-elastic. One or both of the strap segments 178, 180 may be adjustable in length, such as with an adjustable buckle, to accommodate different size seat bases. Alternatively, or in addition to the adjustability, if the strap segments 178, 180 are elastic, the elasticity of the segments 178, 180 may allow sufficient expansion or contraction to accommodate different size seat bases.

The seat strap segments 178, 180 are passed through the side straps 156, 158, respectively. In some embodiments, the side straps 156, 158 are not stationarily secured or coupled to the strap segments 178, 180, but are movable along the length of each segment 178, 180 to different positions. This facilitates collapsing and deployment of the seat storage device 100. In other embodiments, the side straps 156, 158 may be stationarily coupled to the seat strap segments 178, 180.

Figure 13:
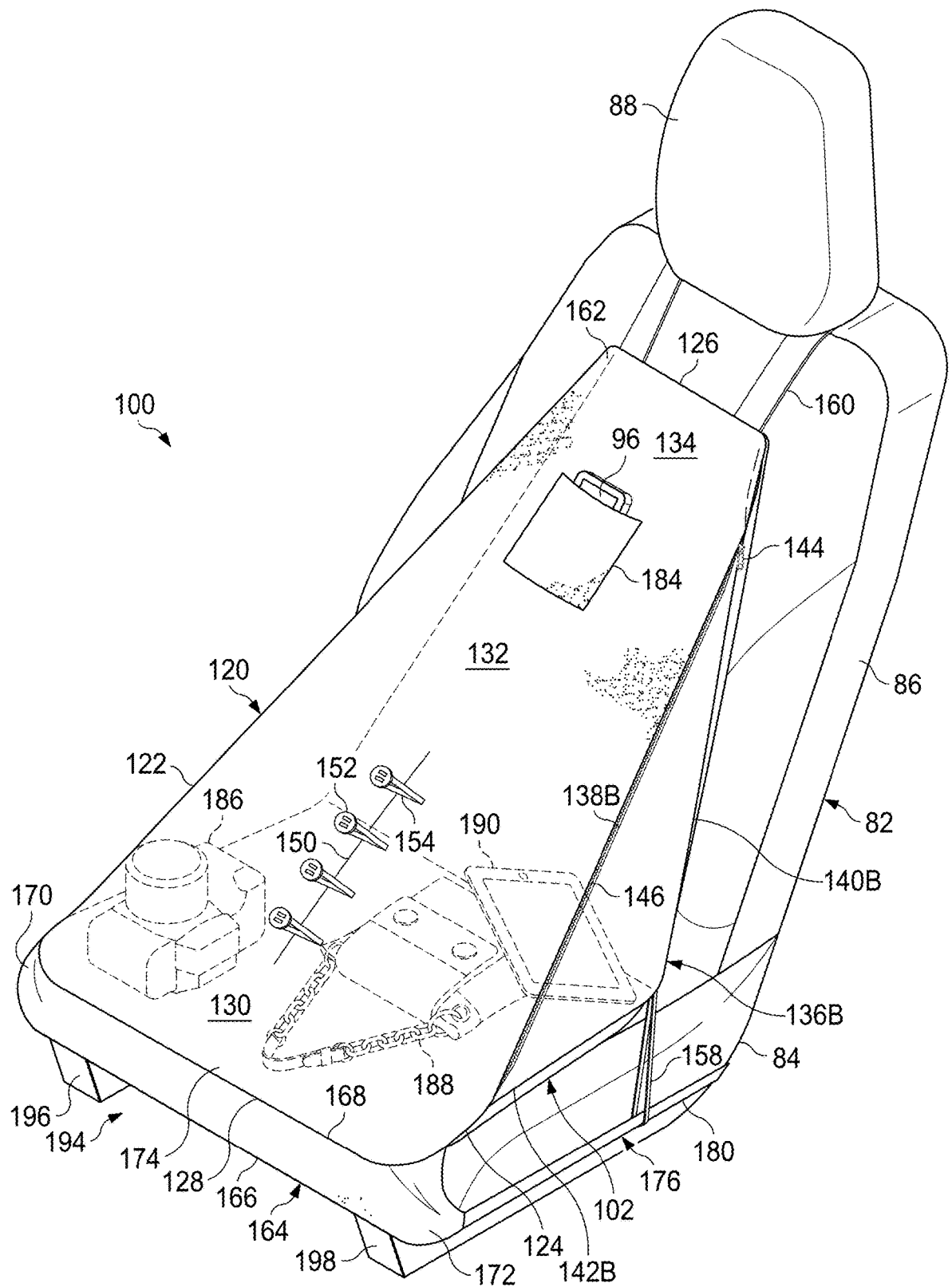
FIG. 13 is a right front perspective view of the seat-top storage device and vehicle passenger seat of FIG. 11, with an upper opening and side opening in closed conditions with items stored within an interior of the storage device.

The device 100 may further comprise a pocket or compartment 184, which may be configured the same or similarly to the compartment 80 of device 10. This may be used for storing various items, such as the mobile phone 96 (FIG. 13).

Referring to FIG. 11, the device 100 is shown employed with the vehicle seat 82, which was described previously with respect to the device 10. In use, the seat-top storage device 100 is secured to the seat 82 by passing or securing the headrest strap 160 over or around the headrest 88. In some instances, it may be desirable to position the headrest strap 160 around the bottom of the headrest 88 or around the support members 90 (FIG. 13) where the headrest 88 is coupled to the backrest 86.

The seat-base apron 166 of the device 10 is positioned so that it overlays the front of the seat base 84 and extends across the width of the seat base 84, as shown in FIG. 11. The two strap segments 178, 180 pass through the left and right side-securing straps 156, 158, respectively, along either side of the seat base 84, or around the supporting structure or frame supporting the seat 82, and are secured together by the buckle assembly 182 or other coupling device to the rear of the seat 82. As shown, the seat-strap segments 178, 180 are spaced apart from the upper surface of the seat base 84 of the vehicle seat 82 when secured around the seat base 84 so that the side straps 156, 158 are pulled downward and may be in tension to facilitate holding the device 100 securely on the seat base 84. The side straps 156, 158 may be positioned on the device 100 so that they are located along the seat base 84 and may be located at or near the junction where the seat base 84 and the backrest 86 of the vehicle seat 82 meet, in certain instances.

Figure 12:
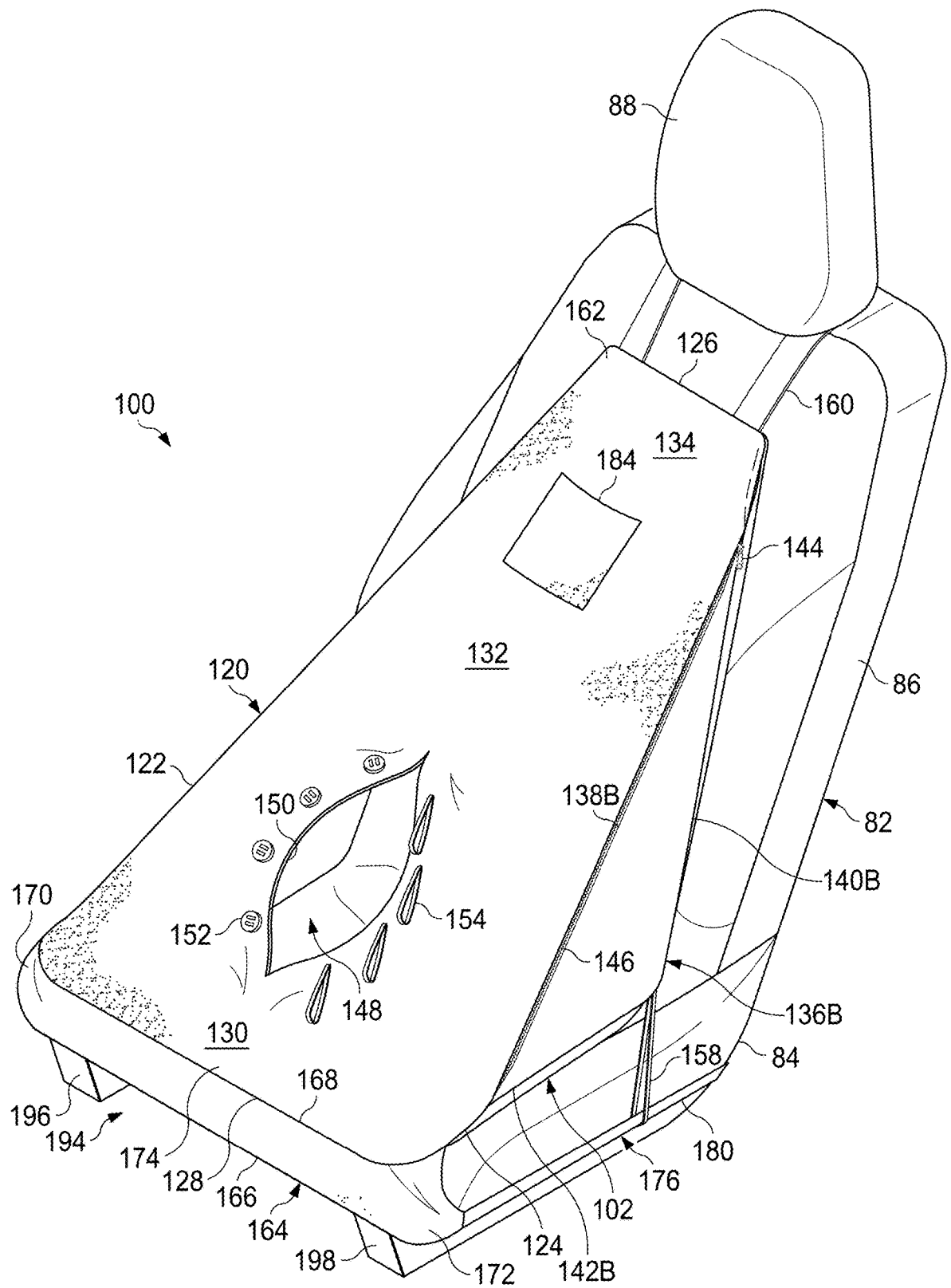
FIG. 12 is a right front perspective view of the seat-top storage device and vehicle passenger seat of FIG. 11, with an upper opening in the open condition and the side opening in a closed condition.

With the seat-top storage device 100 secured to the vehicle seat 82, the seat-top storage device 100 may be in an initial closed and empty condition. In the closed condition, the side opening 146 is closed off by the closure device or zipper 144, as shown in FIG. 12.

To store items or articles within the interior 148 of the device 100 between the lower and upper layers 102, 120, the zipper or closure 144 is opened and items or articles, such as the camera 186, handbag or purse 188, and tablet 190 (FIG. 13), are passed through the side opening 146. The items or articles 186, 188, 190 may then be positioned on the upper surface of the lower layer 102 on the top of the seat base 84. The side opening 146 may then be closed by closing the zipper or closure device 144. Opening and closing of the side opening 146 can easily done by the driver with one hand.

The use of the gusset panels 136A, 136B provides a greater volume to the interior 148 and of the device 100 and facilitates the base portion 112 of the lower layer 102 reaching to the back of the seat base 84 to form a deep pocket. Additionally, because the upper layer 120 may be formed from an elastic material, it may stretch to accommodate larger items or articles positioned within the interior of the device 100.

In addition to the side opening 146, items or articles may also be placed through the upper opening 150 formed in the upper layer 120, which may be closed and secured with the closures 152, 154. Again, the closures used for the upper opening 150 may be easily manipulated by a driver with the use of one hand.

Figure 14:
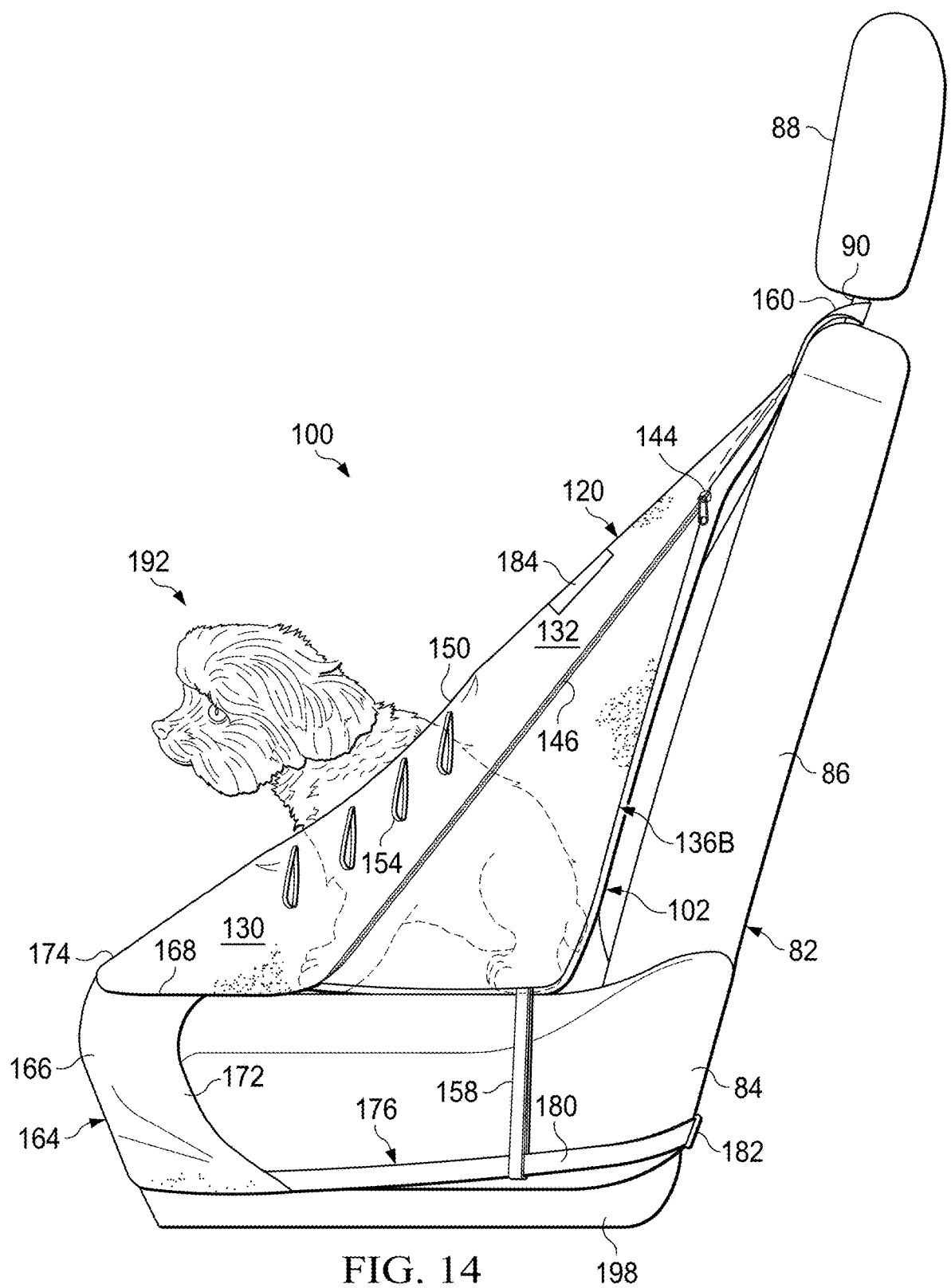
FIG. 14 is a right side elevational view of the seat-top storage device of FIG. 11, shown employed on the vehicle passenger seat, with a pet secured in the storage device.

In addition to storing items and articles, the device 100 may be used for securing a pet or animal (e.g., dog, cat, etc.) on the vehicle seat 82. Referring to FIG. 14, a pet 192 is shown positioned with its body and legs positioned within the interior 148 of the device 100, while its head and neck project out of the opening 150. The buttons 152 and elastic loops 154 facilitating selective partial closing of the opening 150 to a degree sufficient to retain the animal within the device 100, while allowing it to comfortably extend its head and neck through the opening 150. The use of the button and elastic loop closure allows some degree of expansion to give the animal sufficient room to move and also prevents the animal's hair from catching, which may occur with other types of closure devices. The non-slip upper surface of the lower layer 102 also helps the pet, as well as articles, from sliding on the upper surface of the lower layer 102.

As with the device 10, the seat-top storage device 100 also serves in protecting the vehicle seat 82 surface from dirt and spills.

Figure 15:
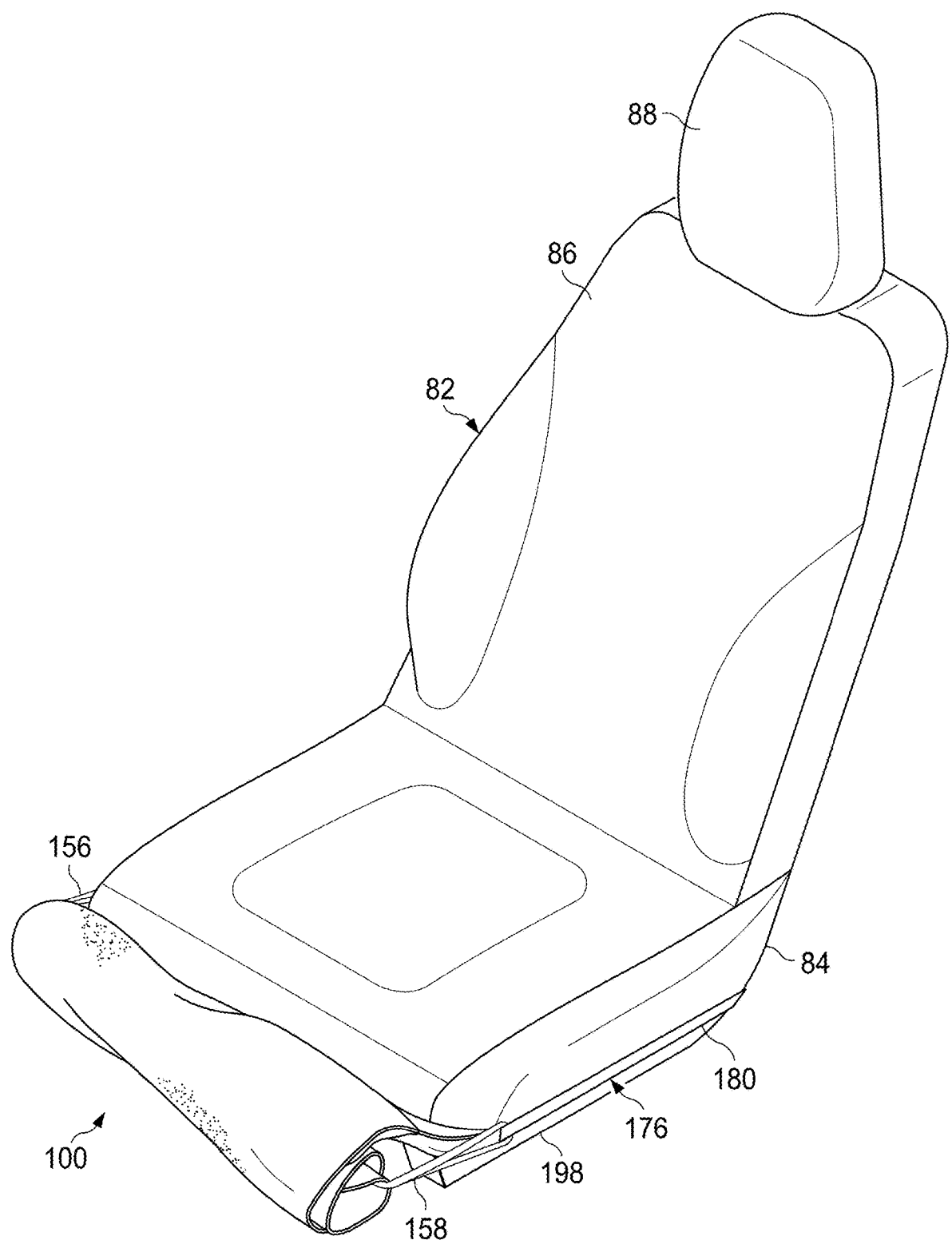
FIG. 15 is a right front perspective view of the seat-top storage device of FIG. 11, shown in a collapsed configuration for storage under a vehicle seat.
Figure 16:
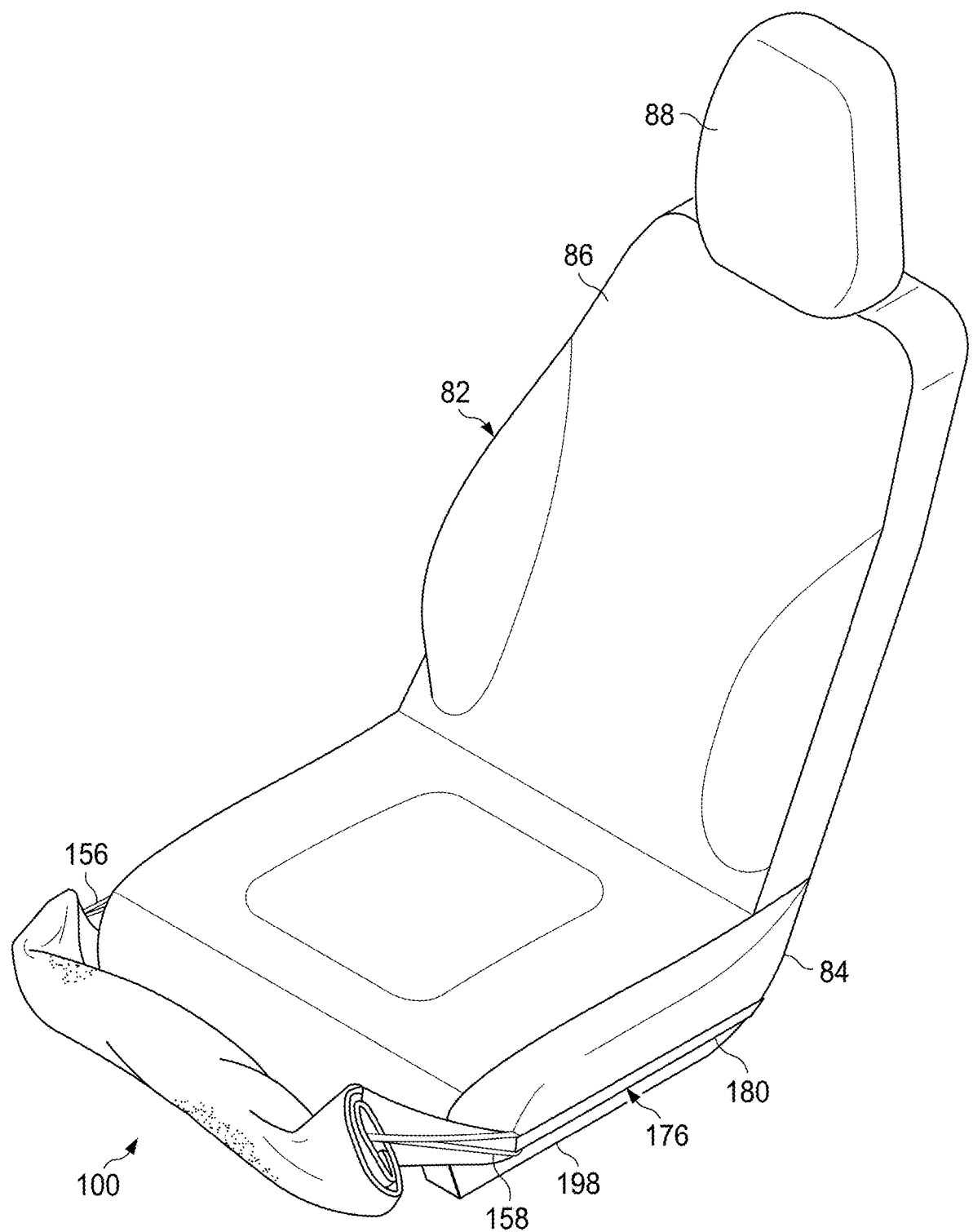
FIG. 16 is a right front perspective view of the seat-top storage device of FIG. 11, shown in a collapsed configuration with ends of the collapsed storage device folded inward for storage under a vehicle seat.

Referring to FIGS. 15 and 16, when the device 100 no longer needs to be used on the vehicle seat 82 or needs to be removed to accommodate a passenger, a user can merely uncouple the headrest strap 160 from the headrest 88. This can be readily done with one hand by the driver. With the seat-base strap 176 still secured around the seat base 84, the device 100 can be folded, gathered or rolled downward in a collapsed configuration, as shown in FIG. 15, and conveniently stored under the seat 82 in lower space 194 between the seat supporting structures 196, 198 (FIG. 11) so that it is out of the way and out of sight. If the collapsed device 100 has a large width, the ends of the collapsed device 100 can be folded inward for storage, as shown in FIG. 16. The seat-base strap 176 does not need to be extremely tight and may have some degree of slack around the seat base 84 so long as the strap 176 does not become detached or easily dislodged during use. Such slack may facilitate the device 100 being stored under the seat 82 while still remaining secured to the seat base 84.

When the device 100 is stored, it is out of the way so that it does not touch or interfere with a passenger sitting on the vehicle seat 82. The device remains out of sight and is not visible when stored under the seat or other storage area.

Figure 17:
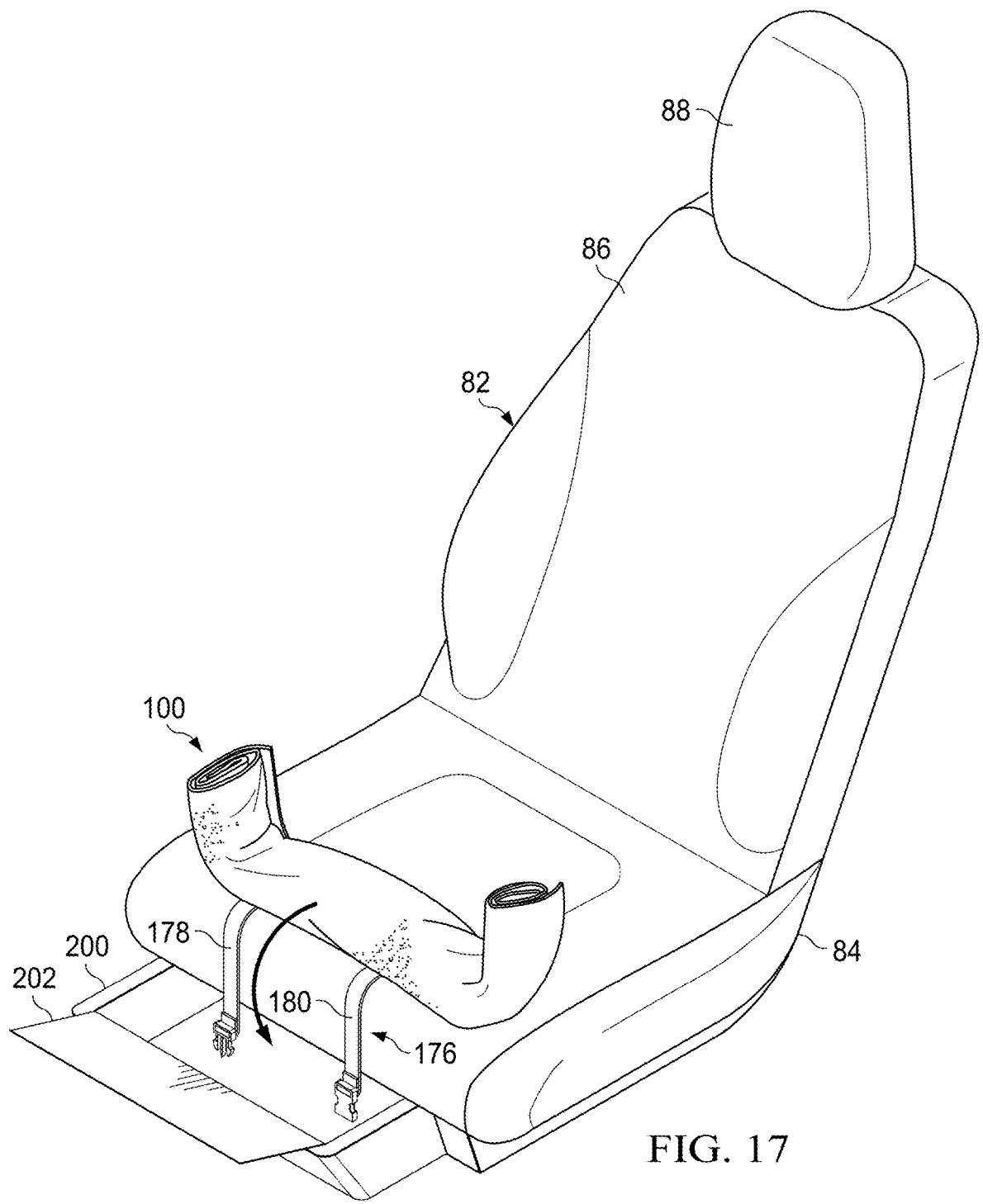
FIG. 17 is a right front perspective view of the seat-top storage device of FIG. 11, shown in a collapsed configuration with ends of the collapsed storage device folded inward for storage in a storage compartment.

Referring to FIG. 17, in some embodiments, a storage area or compartment or drawer 200 for storing the device 100 may be provided with the device 100 or with the vehicle or vehicle seat itself for storing the device 10 when it is not in use. In some applications, vehicles may be manufactured and provided with the storage device seat-top storage devices described herein already installed. In such cases, the vehicle may be provided with a storage compartment or drawer, such as the compartment or drawer 200. The compartment or drawer may be movable and may be mounted on tracks, rails or other devices (not shown), which allows it to be readily pulled out or extended from under the seat 82 to store the device 100 and then be pushed back or retracted under the vehicle seat 82 so that it is out of the way an out of sight. The compartment or drawer 200 may be located forward of the seat base 84 of the vehicle seat 82 when extended out. In some embodiments, a movable cover or lid 202 may be used to selectively open or close the compartment or drawer 200 so that the device 100 is covered. In other embodiments, no lid is provided. The compartment or drawer 200 may be provided with the device 100 and/or provided as part of the vehicle seat 82 itself and be configured to hold and store the collapsed device 100.

Figure 18:
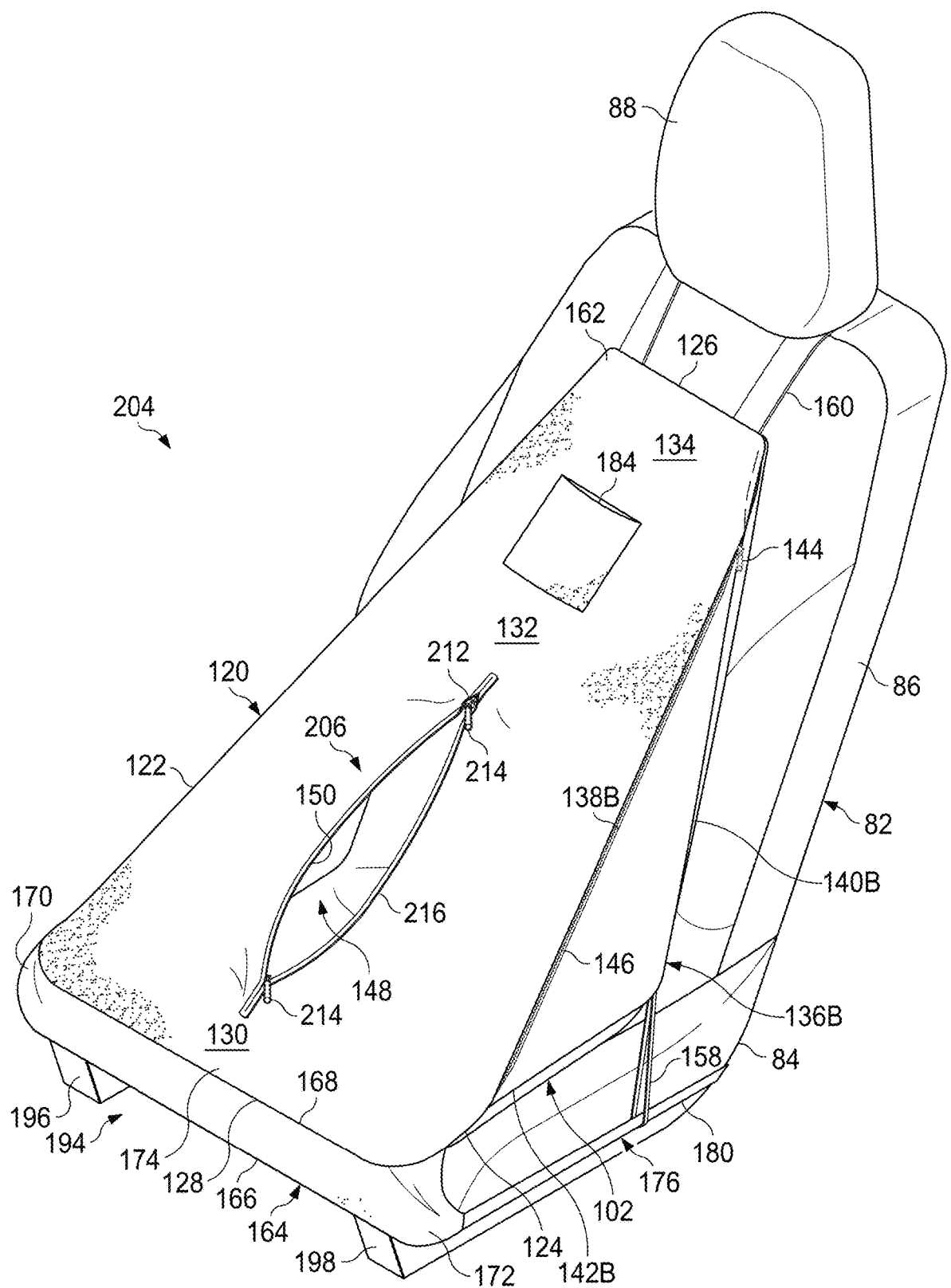
FIG. 18 is a right front perspective view of another embodiment of a seat-top storage device constructed in accordance with particular embodiments of the disclosure that employs a zipper assembly.

FIG. 18 shows still another embodiment of a seat-top storage device 204. The device 204 is similarly constructed to the device 100, previously described, with similar components labeled with the same reference numerals. The device 204 of FIG. 18 differs from device 100 in that it is shown with a zipper assembly 206 as the closure device for opening 150.

Figure 19:
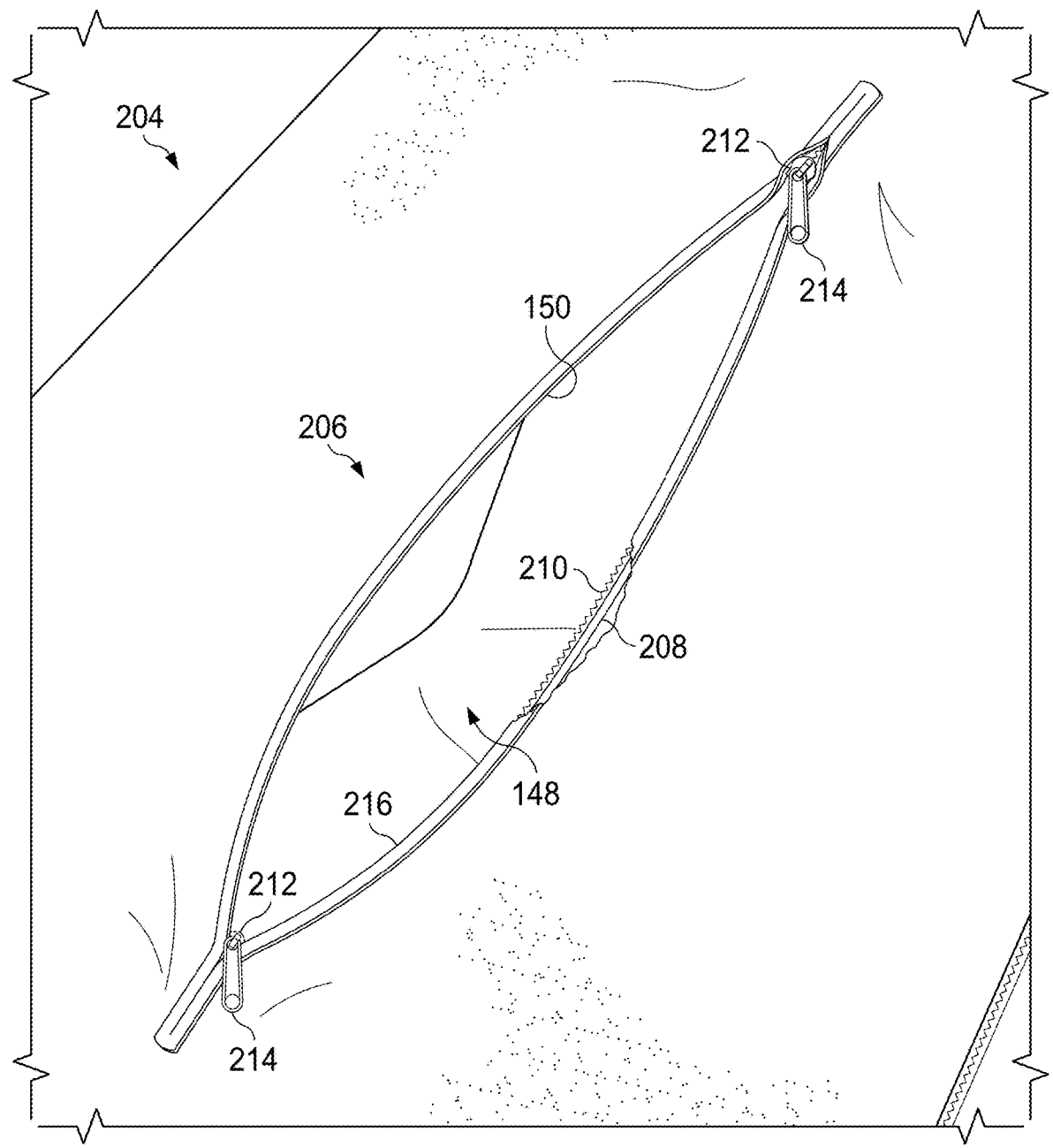
FIG. 19 is an enlarged view of the zipper assembly of the seat-top storage device of FIG. 18.

The zipper assembly 206 is shown in more detail in FIG. 19. The zipper assembly 206 may include strips of zipper tape 208 coupled along either side of material of the upper layer 120 surrounding the opening 150. The strips of zipper tape 208 extend along the length of the opening 150, with the ends of the zipper tape 208 being joined together at or near the ends of the opening 150. Each strip of zipper tape 208 has a series or chain of zipper teeth 210 that extends along the length of the tape 208 that are configured to interlock with corresponding chain of zipper teeth 210 of the other tape strip 208 located on the opposite side of the opening 150. The teeth 208 may be of a metal (e.g., brass, aluminum, etc.) or a polymeric or plastic material, such as nylon.

The zipper assembly 206 includes one or more sliders 212 that are movable along the chain of zipper teeth 210 of each strip of zipper tape 208 to selectively close or interlock the teeth 210 to close the opening 150 and to open or unlock the teeth from one another to open the opening 150. In the embodiment shown, there are two opposite sliders 212 that are movable along the length of the zipper assembly 206. This allows the size of the opening formed by the zipper assembly 206 to be adjusted and also allows the position of the opening to be moved to selected positions between the sliders 212 along the length of the zipper assembly 206. Stops (not shown) may be provided at each end of the zipper assembly 204 to prevent the sliders 212 from running off or detaching from the zipper assembly 204.

Pull tabs 214 are provided with each of the sliders 212 that are configured to be manually grasped to allow a user to adjust the position of each sliders 212 to selectively open or close the opening formed by the zipper assembly 204.

In some applications, the zipper assembly 206 is a non-slip zipper assembly that is configured to prevent the zipper assembly 206 from unintentionally opening or closing, such as by pulling apart the material surrounding the opening 150 on either side of the zipper assembly 206. This may be provided by using a locking zipper slider for the sliders 212. Such locking sliders are configured to engage the zipper teeth to prevent the slider 212 from moving in one or both directions along the length of the zipper assembly 206 unless force is applied to the slider itself so that it is moved, such as by pulling on the pull tabs 214. This prevents the inadvertent opening or closing of the device opening 150. This may be important in such instances where the device 204 is used to secure and retain a pet within the device 204. The non-slip zipper assembly prevents the pet from forcing the zipper assembly open so that the pet is retained by the device 204 and it is unable to expand the opening 150.

A zipper guard 216 is also provided with the device 204. The zipper guard 216 is comprised from a flap or layer of material, which may be the same or different from the material of the upper layer 120, that extends along and overlays the chain of zipper teeth 210 on each side of the zipper assembly 206. The material of the zipper guard 216 may extend beyond the edges of the chain of zipper teeth 210 to provide protection from the edges of the zipper teeth 210 and to prevent items, such as hair, fur, clothing, etc., from getting caught in the zipper assembly 206.

The seat-top storage devices as described herein provide a secure, convenient and easy-to-use means for storing various items or articles, such as electronic devices, mobile phones, tablets, laptop computers, bags or purses, shopping bags, clothing items, documents, food items and snacks, or other personal items. The devices may also be used to comfortably secure pets or animals on a vehicle seat, while allowing them to see out and giving them a degree of freedom. The device is easy to install and use and is readily accessible from the driver's seat. A driver or user can readily access, erect, collapse and store the device with one hand and minimal effort. The device also helps protect the vehicle seat from dirt and spills. Furthermore, it may be formed from opaque materials to obscure or conceal articles stored within the device. This may facilitate protecting the articles from damaging sunlight as well as help deter theft that might otherwise occur should the stored items or articles be visible through the vehicle windows.

While the invention has been shown in some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

I claim:

1. A vehicle seat-top storage device configured to secure to a vehicle seat top, the vehicle seat-top storage device comprising:
   a lower layer formed from a flexible material configured to overlay and conform to portions of a vehicle seat having a seat base and a backrest that extends upward from the seat base;
   an upper layer formed from a flexible sheet material coupled along side edges to the lower layer to define an interior space that extends across a major portion of the length and width of the device between the lower and upper layers;
   an opening formed in the upper layer that allows access to the interior space through the opening, the opening being a slit or slot located at or near the center of the upper layer that extends longitudinally along all or a portion of the length of the upper layer that is oriented vertically or upright when the vehicle seat-top storage device is secured to the vehicle seat top, the opening being provided with a closure device for selectively opening and closing the opening; and
   a seat-base apron that is formed from a flexible layer of material configured to extend across the front of the vehicle seat base when the storage device is secured to and positioned over the vehicle seat top.

2. The vehicle seat-top storage device of claim 1, wherein:
   all or portions of the lower layer are formed from a liquid impervious or liquid resistant material to prevent liquids from passing through the lower layer.

3. The vehicle seat-top storage device of claim 1, wherein:
   the lower layer has a backrest portion configured to overlay the backrest and a base portion configured to overlay the seat base of the vehicle seat, the lower layer extending from the backrest portion to the front of the seat base when the storage device is secured to and positioned over the vehicle seat top.

4. The vehicle seat-top storage device of claim 1, further comprising:
   at least one storage compartment provided on the upper layer for storing items on the upper layer.

5. The vehicle seat-top storage device of claim 1, further comprising:
   a second opening is provided in the device along a side edge of the device to allow access to the interior of the device through the side.

6. The vehicle seat-top storage device of claim 1, wherein:
   the storage device covers a majority of the surface of the upper surface of the seat base and backrest.

7. The vehicle seat-top storage device of claim 1, wherein:
   the closure device is at least one of a zipper assembly, a hook and loop fastener, snaps, buttons, buttons and loops, magnets, a tie, and a toggle and cord.

8. The vehicle seat-top storage device of claim 1, wherein:
   at least one of the upper and layers, or portions thereof, is formed from an insulating material.

9. The vehicle seat-top storage device of claim 1, wherein:
   the closure device is a zipper assembly having two opposite sliders mounted on a zipper chain of the zipper assembly.

10. The vehicle seat-top storage device of claim 1, wherein:
    the closure device is a non-slip zipper assembly that comprises a locking slider.

11. The vehicle seat-top storage device of claim 1, wherein:
    the closure device is a zipper assembly having zipper teeth provided on either side of the opening, and wherein a zipper guard extends over the zipper teeth to prevent items from being caught in the zipper teeth.

12. The vehicle seat-top storage device of claim 1, wherein:
    the upper and lower layers are coupled together along at least a portion of the side edges of the upper and lower layers by a gusset panel.

13. The vehicle seat-top storage device of claim 1, wherein:
    all or a portion the lower layer is provided or formed with a material with a non-slip surface.

14. The vehicle seat-top storage device of claim 1, further comprising:
    a device storage compartment for storing the device when the device is not in use.

15. A vehicle seat-top storage device configured to secure to a vehicle seat top, the vehicle seat-top storage device comprising:
    a lower layer formed from a flexible material configured to overlay and conform to portions of a vehicle seat having a seat base and a backrest that extends upward from the seat base;
    an upper layer formed from a flexible sheet material coupled along side edges to the lower layer to define an interior space that extends across a major portion of the length and width of the device between the lower and upper layers;
    an opening that allows access to the interior space through the opening, the opening being provided with a closure device for selectively opening and closing the opening; and
    a seat-base apron that is formed from a flexible layer of material configured to extend across the front of the vehicle seat base when the storage device is secured to and positioned over the vehicle seat top.

16. The vehicle seat-top storage device of claim 15, wherein:
    the closure device is a zipper assembly having two opposite sliders mounted on a zipper chain of the zipper assembly.

17. The vehicle seat-top storage device of claim 15, wherein:
    the closure device is a non-slip zipper assembly that comprises a locking slider.

18. The vehicle seat-top storage device of claim 15, wherein:
    the closure device is a zipper assembly having zipper teeth provided on either side of the opening, and wherein a zipper guard extends over the zipper teeth to prevent items from being caught in the zipper teeth.

19. The vehicle seat-top storage device of claim 15, wherein:

the upper and lower layers are coupled together along at least a portion of the side edges of the upper and lower layers by a gusset panel.

20. A method of storing items in a vehicle seat-top storage device, the method comprising:
    providing a vehicle seat-top storage device comprising:
        a vehicle seat-top storage device configured to secure to a vehicle seat top, the vehicle seat-top storage device comprising:
        a lower layer formed from a flexible material configured to overlay and conform to portions of a vehicle seat having a seat base and a backrest that extends upward from the seat base;
        an upper layer formed from a flexible sheet material coupled along side edges to the lower layer to define an interior space that extends across a major portion of the length and width of the device between the lower and upper layers;
        an opening formed in the upper layer that allows access to the interior space through the opening, the opening being a slit or slot located at or near the center of the upper layer that extends longitudinally along all or a portion of the length of the upper layer that is oriented vertically or upright when the vehicle seat-top storage device is secured to the vehicle seat top, the opening being provided with a closure device for selectively opening and closing the opening; and
        a seat-base apron that is formed from a flexible layer of material configured to extend across the front of the vehicle seat base when the storage device is secured to and positioned over the vehicle seat top;
    securing the vehicle seat-top storage device to a vehicle seat; and
    positioning an item to be stored within the interior space between the lower and upper layers while the vehicle seat-top storage device is secured to the vehicle seat.

* * * * *

UNITED STATES PATENT AND TRADEMARK OFFICE
CERTIFICATE OF CORRECTION

Page 1 of 1

PATENT NO. : 12,472,877 B2
APPLICATION NO. : 19/070866
DATED : November 18, 2025
INVENTOR(S) : Wei K. Hsu It is certified that error appears in the above-identified patent and that said Letters Patent is hereby corrected as shown below:

In the Claims

Claim 8, Column 16, Line 2: before "layers" insert --lower--

Signed and Sealed this
Sixteenth Day of December, 2025

John A. Squires
*Director of the United States Patent and Trademark Office*